US009645735B2

(12) United States Patent
Suzuki

(10) Patent No.: US 9,645,735 B2
(45) Date of Patent: May 9, 2017

(54) INFORMATION PROCESSING DEVICE AND INFORMATION PROCESSING METHOD

(71) Applicant: FUJITSU LIMITED, Kawasaki-shi, Kanagawa (JP)

(72) Inventor: Genta Suzuki, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 236 days.

(21) Appl. No.: 14/164,384

(22) Filed: Jan. 27, 2014

(65) Prior Publication Data

US 2014/0292723 A1 Oct. 2, 2014

(30) Foreign Application Priority Data

Apr. 2, 2013 (JP) .................... 2013-077240

(51) Int. Cl.
*G09G 5/00* (2006.01)
*G06F 3/01* (2006.01)
*G03B 21/00* (2006.01)
*G06F 3/0488* (2013.01)
*G06F 3/03* (2006.01)
(Continued)

(52) U.S. Cl.
CPC .......... *G06F 3/04883* (2013.01); *G06F 3/017* (2013.01); *G06F 3/0304* (2013.01); *G06F 3/0416* (2013.01); *G06F 3/0425* (2013.01); *G06F 2203/04101* (2013.01)

(58) Field of Classification Search
CPC .... G09G 5/00; G09G 5/08; G06F 3/00; G06F 3/01; G06F 3/041; G06F 3/042; G06F 3/048; G06F 3/04883; G06F 3/033; G06K 7/00; G06K 7/10; G06K 9/00; G06K 9/34; A63B 69/00; H04N 5/00; H04N 5/64;
(Continued)

(56) References Cited

U.S. PATENT DOCUMENTS

| 6,463,220 B1* | 10/2002 | Dance ................. G03B 17/06 396/431 |
| 2009/0116742 A1* | 5/2009 | Nishihara ............ G06F 3/0425 382/173 |

(Continued)

FOREIGN PATENT DOCUMENTS

JP 2003-346162 12/2003

OTHER PUBLICATIONS

"SixthSense: A Wearable Gestural Interface", Pranav Mistry, Pattie Maes; In the Proceedings of SIGGRAPH Asia 2009, Emerging Technologies. Yokohama, Japan. 2009.

*Primary Examiner* — Ilana Spar
*Assistant Examiner* — Nguyen H Truong
(74) *Attorney, Agent, or Firm* — Staas & Halsey LLP

(57) ABSTRACT

An information processing device includes a processor; and a memory which stores a plurality of instructions, which when executed by the processor, cause the processor to execute, acquiring a captured image captured by a camera; measuring a three-dimensional coordinate position of a manipulating object included in the captured image acquired by the acquiring; and controlling a projector to display an image on the manipulating object based on a distance between the three-dimensional coordinate position measured by the measuring and a border of a three-dimensional area in which the three-dimensional coordinate position of the manipulating object is capable of being measured, determined by the camera.

20 Claims, 20 Drawing Sheets

(51) Int. Cl.
*G06F 3/041* (2006.01)
*G06F 3/042* (2006.01)

(58) Field of Classification Search
CPC ........ G03B 21/00; G03B 21/14; G03B 21/26; G03B 19/00; G03B 17/00; G03B 17/48
See application file for complete search history.

(56) References Cited

U.S. PATENT DOCUMENTS

| | | | |
|---|---|---|---|
| 2010/0050133 A1* | 2/2010 | Nishihara | G06F 3/017 715/863 |
| 2010/0259633 A1* | 10/2010 | Kii | G06F 3/038 348/222.1 |
| 2010/0289826 A1* | 11/2010 | Park | G06F 3/04883 345/676 |
| 2011/0169746 A1* | 7/2011 | Kitajima | G03B 21/00 345/173 |
| 2012/0200494 A1* | 8/2012 | Perski | G06F 3/017 345/156 |
| 2012/0256824 A1* | 10/2012 | Mizunuma | G06F 3/0425 345/156 |
| 2013/0295539 A1* | 11/2013 | Wilson | H04N 9/3147 434/247 |

* cited by examiner

FIELD-OF-VIEW RANGE

TABLE SURFACE

FIELD-OF-VIEW RANGE OF CAMERA
HAVING NARROW ANGLE-OF-VIEW

FIELD-OF-VIEW RANGE

TABLE SURFACE

FIELD-OF-VIEW RANGE OF CAMERA
HAVING WIDE ANGLE-OF-VIEW (a) IMAGE CAPTURED BY CAMERA 1

(b) IMAGE CAPTURED BY CAMERA 2

(a) ONLY HAND AREA EXTRACTED FROM IMAGE CAPTURED BY CAMERA 1

(b) ONLY HAND AREA EXTRACTED FROM IMAGE CAPTURED BY CAMERA 2

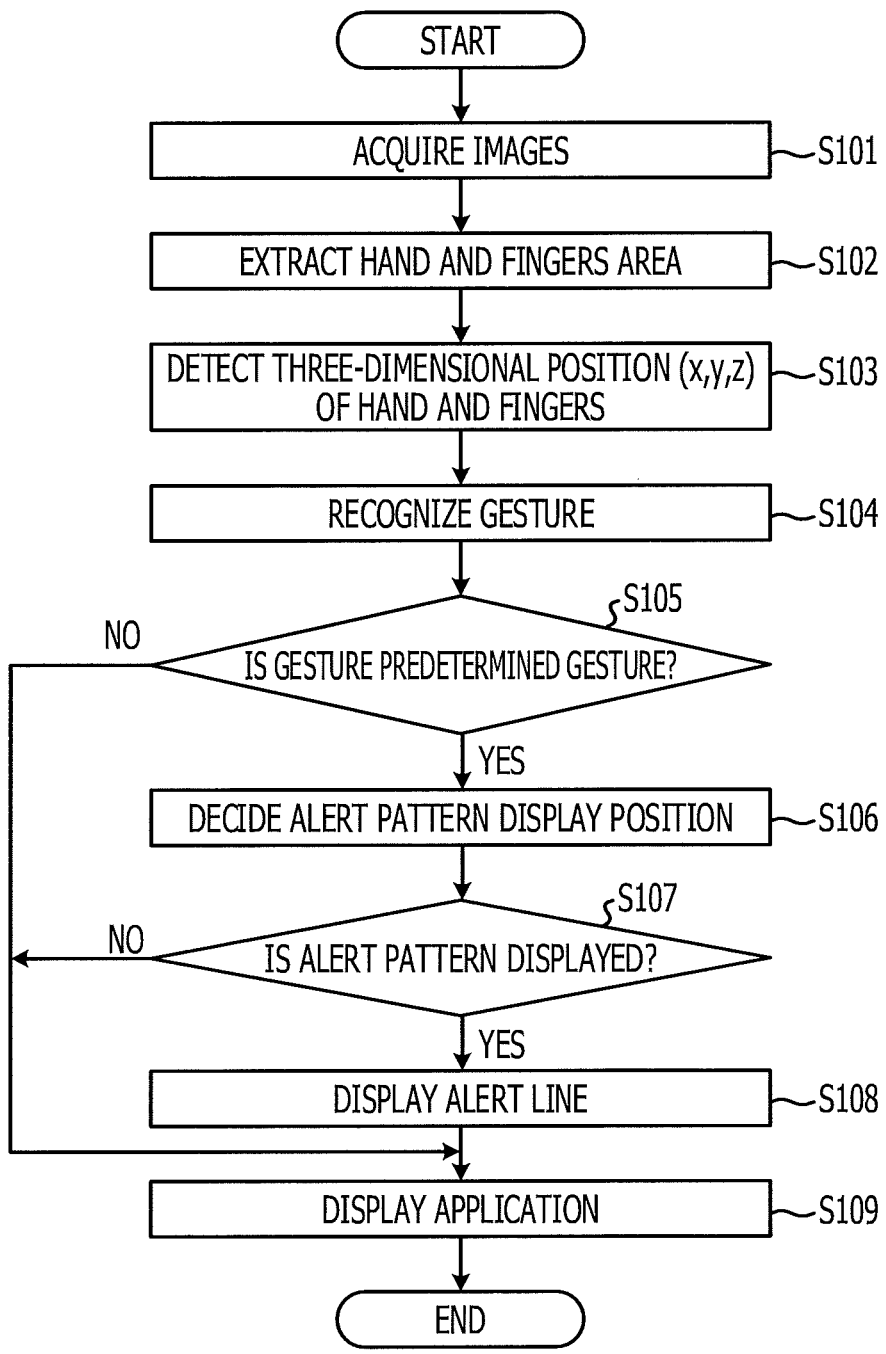

INFORMATION PROCESSING DEVICE AND INFORMATION PROCESSING METHOD

CROSS-REFERENCE TO RELATED APPLICATION

This application is based upon and claims the benefit of priority of the prior Japanese Patent Application No. 2013-077240, filed on Apr. 2, 2013, the entire contents of which are incorporated herein by reference.

FIELD

The embodiments discussed herein are related to an information processing device, an information processing method, and an information processing program.

BACKGROUND

In recent years, an augmented reality technology has become known in which a virtual image is projected onto an actual object using a projector, and annotations, menus, and the like that are associated with the actual object are presented. In addition, in the augmented reality technology such as this, a user interface technology is used in which a gesture made by a manipulating object, such as a hand and fingers, is detected and interaction with a virtual image is actualized.

As a method for detecting such gestures made by the manipulating object, for example, P. Mistry, P. Maes, "Sixth Sense—A Wearable Gestural Interface" in the Proceedings of SIGGRAPH Asia 2009, Emerging Technologies, Yokohama, Japan, 2009 discloses a method for measuring three-dimensional coordinates of the manipulating object using captured images of the manipulating object that have been captured by a camera, and detecting a gesture based on changes in the three-dimensional coordinates.

SUMMARY

In accordance with an aspect of the embodiments, an information processing device includes a processor; and a memory which stores a plurality of instructions, which when executed by the processor, cause the processor to execute, acquiring a captured image captured by a camera; measuring a three-dimensional coordinate position of a manipulating object included in the captured image acquired by the acquiring; and controlling a projector to display an image on the manipulating object based on a distance between the three-dimensional coordinate position measured by the measuring and a border of a three-dimensional area in which the three-dimensional coordinate position of the manipulating object is capable of being measured, determined by the camera.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 14 is a flowchart of procedures in an alert line display process performed by the information processing device;

DESCRIPTION OF EMBODIMENTS

Hereinafter, embodiments of an information manipulation display system, an information processing device, an information processing method, and an information processing program disclosed in the present application will be described in detail with reference to the drawings. The disclosed technology is not limited by these embodiments. The embodiments may be combined accordingly to an extent that processing contents are not contradictory.

Embodiment 1

[Configuration of Information Manipulation Display System]

Figure 1:
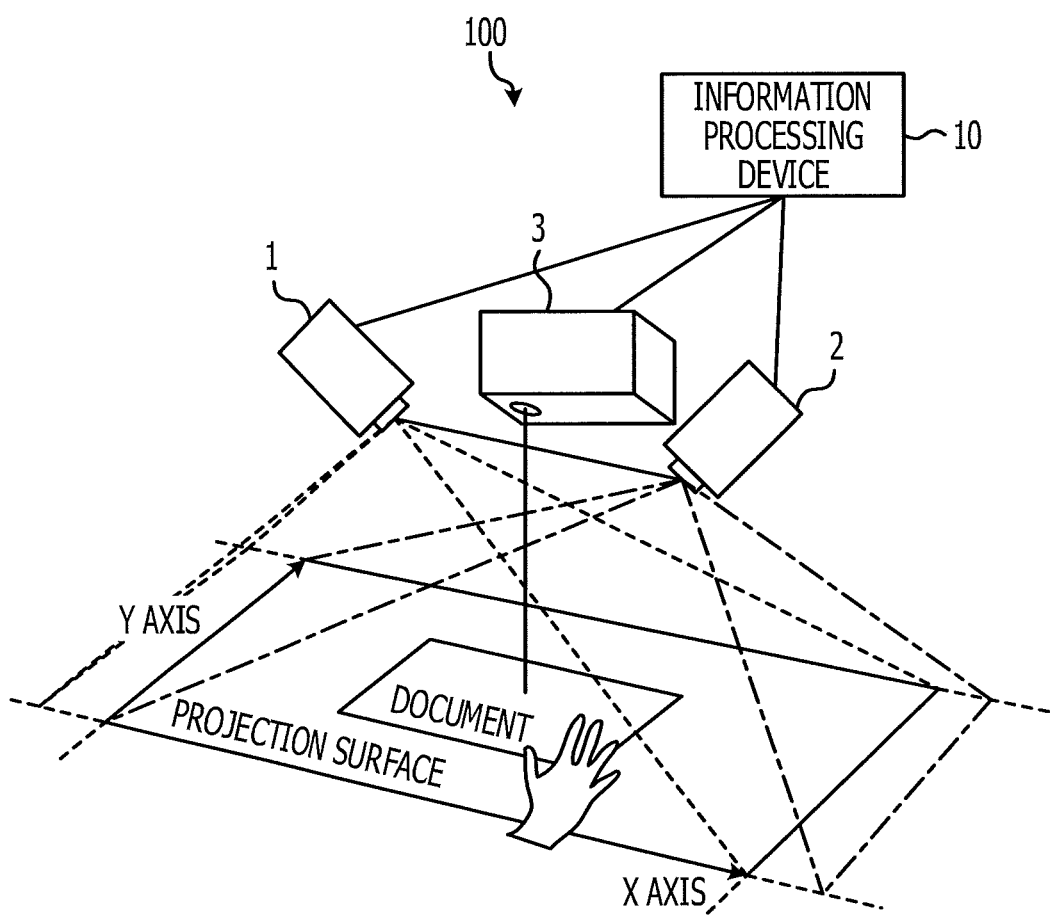
FIG. 1 is a diagram illustrating an example of an overall configuration of an information manipulation display system.

FIG. 1 is a diagram illustrating an example of an overall configuration of an information manipulation display system. As illustrated in FIG. 1, an information manipulation display system 100 includes cameras 1 and 2, a projector (display device) 3, and an information processing device 10. The information processing device 10 is connected to the cameras 1 and 2, and the projector 3 by a network (not illustrated), such as to be capable of communication. The projector 3 projects an image onto a predetermined projection surface. The cameras 1 and 2 capture images of the image projected onto the projection surface, and a manipulating object (such as a hand and fingers of a manipulator) placed on the projected image. The information processing device 10 calculates a three-dimensional position of the manipulating object from images in time series that have been captured by the cameras 1 and 2.

The information processing device 10 then determines a manipulation to be performed on a manipulated object, such as a document, based on the calculated three-dimensional position of the manipulating object. For example, the information processing device 10 determines which information in the document has been touched (selected), and whether or not the touch (selection) has been canceled. The network used to connect the information processing device 10 to the cameras 1 and 2, and the projector 3 may be wired or wireless. The network may be an arbitrary communication network, such as a local area network (LAN) or a virtual private network (VPN).

The shutter timings of the cameras 1 and 2 may not necessarily be the same. In other words, the cameras 1 and 2 may be asynchronous cameras. In addition, the information manipulation display system 100 may have three or more cameras. Furthermore, although the projector 3 and the information processing device 10 are connected by a network herein, the projector 3 and the information processing device 10 may not be connected. An example is described in which an object to be captured by the cameras 1 and 2 is a hand and fingers of a manipulator manipulating a projected document. However, the object is not limited thereto. For example, the object may be a pen or a stick.

Figure 2:
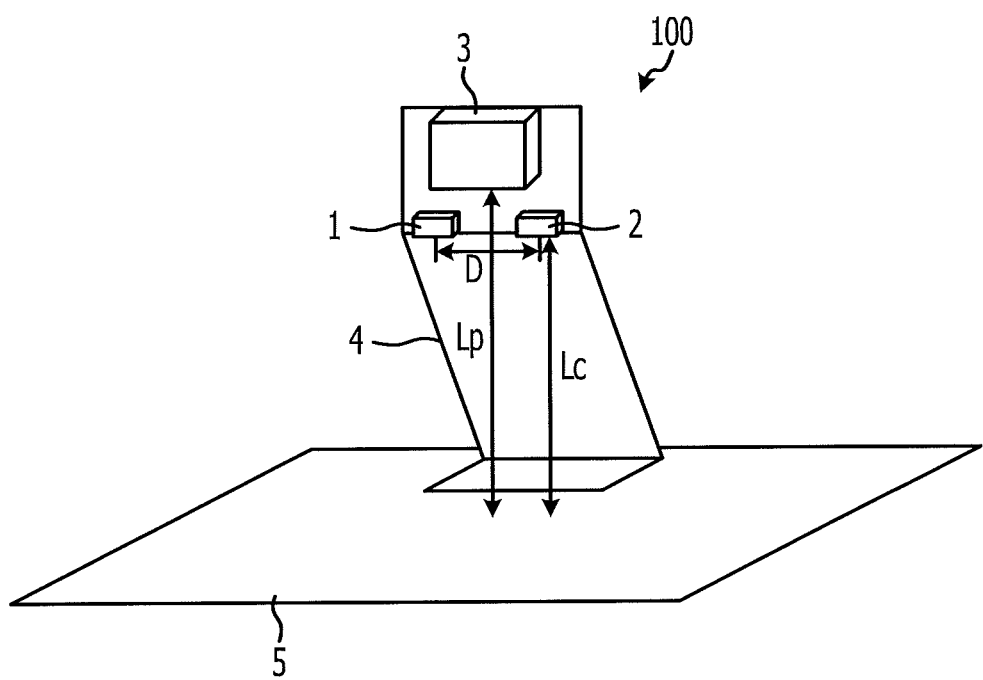
FIG. 2 is a diagram illustrating a hardware configuration of the information manipulation display system in an instance in which a stereo camera is used.

Next, a hardware configuration of the information manipulation display system 100 according to an embodiment 1 will be described with reference to FIG. 2. FIG. 2 is a diagram illustrating a hardware configuration of an information manipulation display system in an instance in which a stereo camera is used. As illustrated in FIG. 2, in the information manipulation display system 100, the two cameras 1 and 2, and the projector 3 are fixed by a fixing base 4, as a device set on the table 5. The two cameras 1 and 2 serve as a stereo camera. The two cameras 1 and 2, and the projector 3 are connected by wire or wirelessly to a computer.

The cameras 1 and 2 are each set in parallel with a table surface, at a height of Lc from the table surface. The distance between the two cameras 1 and 2 is D. The projector 3 is set in the center between the two cameras 1 and 2, at a height of Lp from the table surface. The dimensions Lc, Lp, and D are lengths in actual space and are, for example, in millimeter units. The cameras 1 and 2 each have a horizontal-direction angle-of-view $\alpha_{ch}$ and a vertical-direction angle-of-view $\alpha_{cv}$. The values of the horizontal-direction angle-of-view $\alpha_{ch}$ and the vertical-direction angle-of-view $\alpha_{cv}$, the focal distance, and the size of the image that may be captured are the same for both cameras 1 and 2. The projector 3 has an angle-of-view of $\alpha_{ph}$ in the horizontal direction and an angle-of-view of $\alpha_{pv}$ in the vertical direction. The horizontal angle-of-view is greater than the vertical angle-of-view for both the cameras 1 and 2, and the projector 3.

Here, an example of use of the information manipulation display system 100 will be described. For example, confirmation of product design is an example of use of the information manipulation display system 100. A mock-up of a product for which the color and package design have not yet been decided may be placed on a table. The projector 3 may be used to display color such as to overlap the product mock-up, as well as to add an illustration to the product mock-up, thereby enabling product package designs to be reviewed using the actual product mock-up.

In addition, for example, the information manipulation display system 100 is also capable of actualizing intuitive manipulation by recognizing gestures made by the hand and fingers. For example, an illustration may be drawn by a finger touching the product mock-up, and a color being displayed by the projector 3 in the area that is being touched. Furthermore, display content may be controlled by a gesture made using three-dimensional space in the air. For example, as a result of a gesture being made in which the hand is waved left and right in the air, the display color may be switched to other colors, such as from red to yellow to green to blue to purple. In addition, as a result of the hand being moved up and down, the concentration of the display color may be changed.

[Configuration of Information Processing Device]

Figure 3:
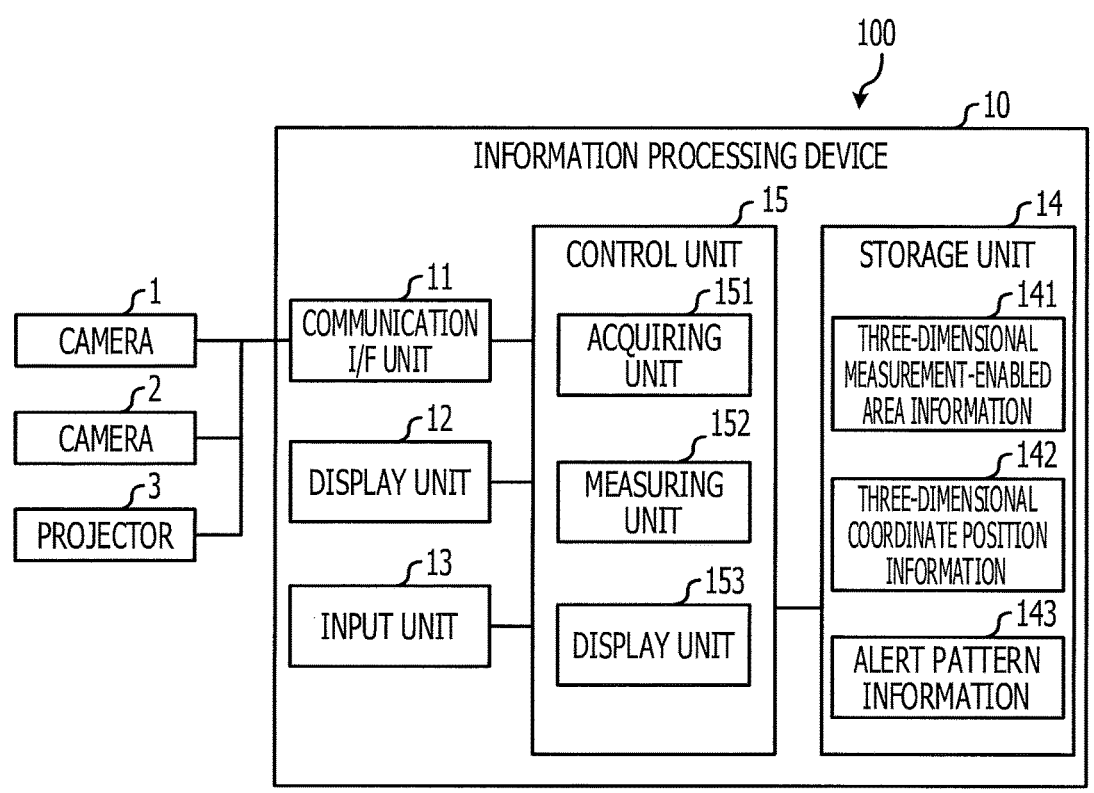
FIG. 3 is a diagram illustrating an overall configuration of an information processing device.

Next, the information processing device 10 according to the embodiment 1 will be described with reference to FIG. 3. FIG. 3 is a diagram illustrating an overall configuration of the information processing device. As illustrated in FIG. 3, the information processing device 10 includes a communication interface (I/F) unit 11, a display unit 12, an input unit 13, a storage unit 14, and a control unit 15.

The communication I/F unit 11 is an interface that performs communication control between the information processing device 10 and other devices. The communication I/F unit 11 receives various pieces of information over the network. For example, the communication I/F unit 11 receives the images of the document and the manipulating object from the cameras 1 and 2. A network interface card, such as a LAN card, may be given as an example of the communication I/F unit 11.

The display unit 12 is a display device that displays various pieces of information. For example, a display device, such as a liquid crystal display (LCD) or a cathode ray tube (CRT), may be given as an example of the display unit 12. The display unit 12 displays various pieces of information. For example, the display unit 12 displays pieces of information stored in the storage unit 14.

The input unit 13 is an input device that inputs various pieces of information. For example, an input device, such as a mouse, a keyboard, or a touch sensor, may be given as an example of the input unit 13. The input unit 13 outputs information inputted by a user of the information processing device 10 to the control unit 15. For example, when the input unit 13 receives information serving as the basis for three-dimensional measurement-enabled area information 141, three-dimensional coordinate position information 142, alert pattern information 143, and the like, described hereafter, the input unit 13 outputs the information to the control unit 15 and stores the information in the storage unit 14 via the control unit 15.

The storage unit 14 is a non-volatile storage device, such as a hard disk, a solid state drive (SSD), or an optical disc. The storage unit 14 may also be a semiconductor memory capable of rewriting data, such as a random access memory (RAM), a flash memory, or a non-volatile static random access memory (NVSRAM).

The storage unit 14 stores therein an operating system (OS) and various programs run by the control unit 15. In addition, the storage unit 14 stores therein various pieces of data used by the programs and various pieces of data generated by the programs. For example, the storage unit 14 stores therein the three-dimensional measurement-enabled area information 141, the three-dimensional coordinate position information 142, and the alert pattern information 143.

Figure 4:
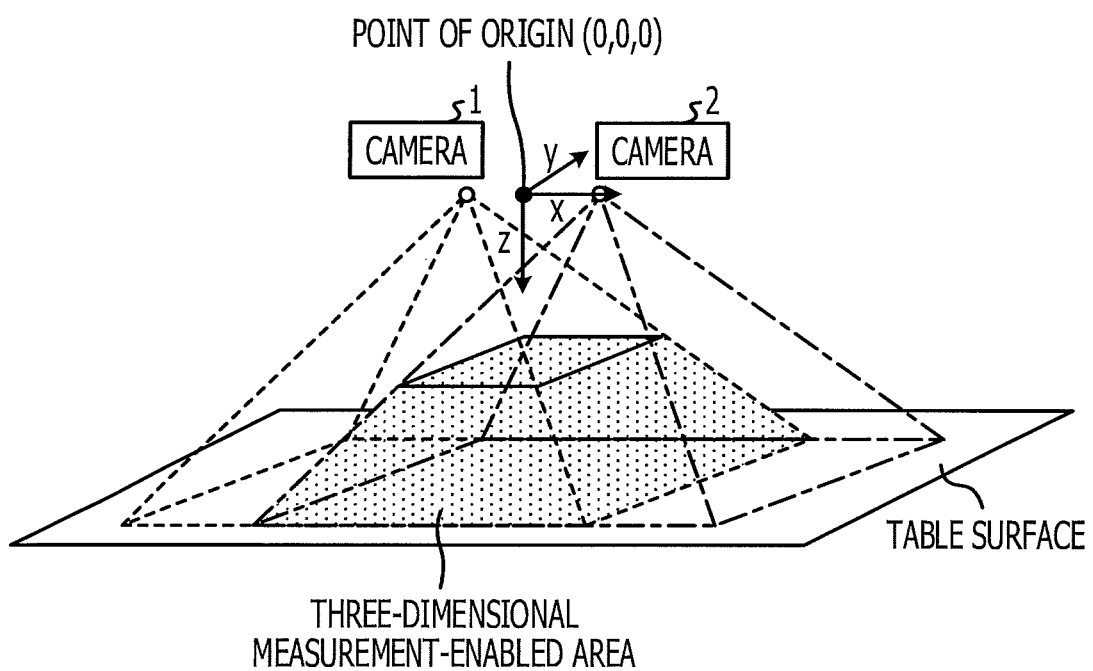
FIG. 4 is a diagram illustrating a three-dimensional measurement-enabled area.

The three-dimensional measurement-enabled area information 141 is information related to three-dimensional coordinates of a three-dimensional measurement-enabled area in which a three-dimensional position of the manipulating object may be measured. The three-dimensional measurement-enabled area information 141 is set and stored in advance. Here, the three-dimensional measurement-enabled area information will be described with reference to FIG. 4. FIG. 4 is a diagram illustrating a three-dimensional measurement-enabled area. As illustrated in FIG. 4, a three-dimensional field-of-view from the cameras 1 and 2 to the table surface has a quadrangular pyramid shape. Only a certain area within the quadrangular pyramid serves as the three-dimensional measurement-enabled area. In a three-dimensional coordinate system in actual space, with a point at the center between the setting positions of the cameras 1 and 2 as a point of origin (0,0,0), as illustrated in FIG. 4, the left-right direction is an X axis, a depth direction is a Y axis, and an up-down direction is a Z axis. The three-dimensional coordinates are in, for example, millimeter units. In addition, the X axis corresponds to the horizontal angle-of-view of the cameras 1 and 2, and the Y axis corresponds to the vertical angle-of-view of the cameras 1 and 2. A method for setting the three-dimensional measurement-enabled area will be described in detail hereafter, with reference to FIG. 8.

Figure 5A:
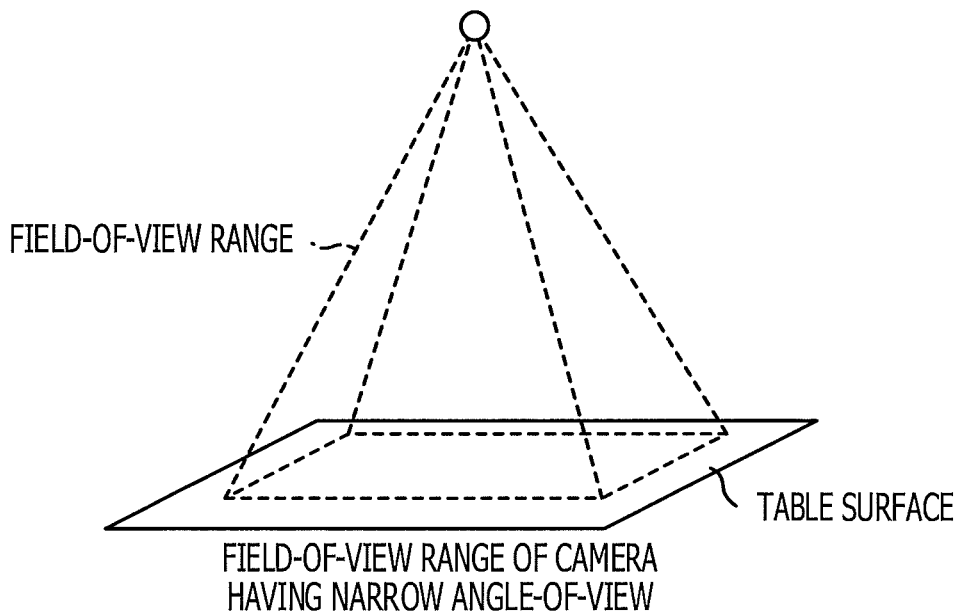
FIG. 5A is a diagram illustrating differences in field-of-view range depending on an angle-of-view of a camera.
Figure 5B:
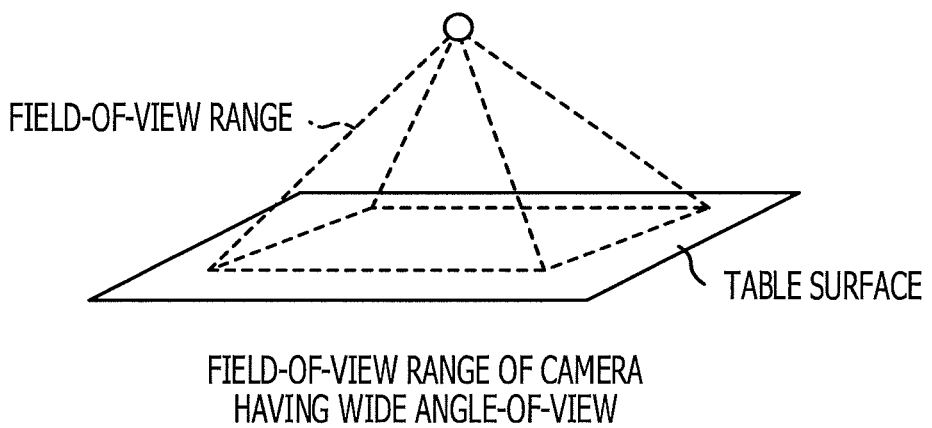
FIG. 5B is a diagram illustrating the differences in field-of-view range depending on the angle-of-view of the camera.

In addition, to reduce the overall size of the information manipulation display system 100, use of a wide-angle camera is effective for lowering height. FIGS. 5A and 5B illustrate field-of-view ranges of cameras with differing angles-of-view. As illustrated in FIGS. 5A and 5B, when the field-of-view range on the table surface is to be made the same size, compared to a camera having a narrow angle-of-view illustrated in FIG. 5A, a camera having a wide angle-of-view illustrated in FIG. 5B may be placed at a lower height. However, in the camera having a wide angle-of-view, the field-of-view range significantly changes depending on the height of the hand and fingers making a gesture. As a result, when a user makes a gesture, the hand and fingers tend to leave the gesture field-of-view range, or in other words, the three-dimensional measurement-enabled area. In addition, the wider the angle-of-view of the camera is, the more difficult it becomes for the user to recognize the three-dimensional measurement-enabled area.

The three-dimensional coordinate position information 142 is information related to the three-dimensional coordinate position of hand and fingers that are the manipulating object measured by a measuring unit 152, described hereafter. In addition, the alert pattern information 143 is information related to shape, color, and the like of an alert pattern that is displayed by the projector 3 to give notification that the hand and fingers are near a border of the three-dimensional measurement-enabled area. The alert pattern information 143 is information that is referenced when the display unit 153, described hereafter, displays the alert pattern.

The control unit 15 is a device that controls the information processing device 10. As the control unit 15, an electronic circuit, such as a central processing unit (CPU) or a micro processing unit (MPU), or an integrated circuit, such as an application specific integrated circuit (ASIC) or a field programmable gate array (FPGA), may be used. The control unit 15 has an internal memory used to store therein programs prescribing various processing procedures and control data. The control unit 15 uses the stored programs and pieces of control data to perform various processes. For example, various programs are run in the control unit 15, and the control unit 15 provides functions as various processing units. The control unit 15 includes an acquiring unit 151, the measuring unit 152, and the display unit 153.

Figure 6A:
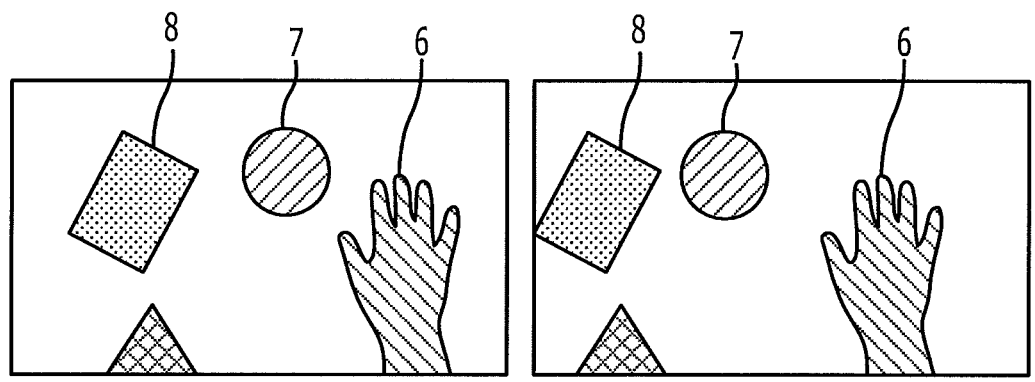
FIG. 6A is a diagram explaining a process for extracting an area of an object.

The acquiring unit 151 acquires the captured images captured by the cameras 1 and 2. For example, the acquiring unit 151 acquires images from the two cameras 1 and 2 a predetermined number of times (such as 60 times) per second. The acquiring unit 151 acquires images, such as those illustrated in FIG. 6A, from the two cameras 1 and 2. Part (a) in FIG. 6A is an image captured by the camera 1. Part (b) in FIG. 6A is an image captured by the camera 2. A positional relationship between the hand and fingers, and the image projected by the projector 3 differs between the captured image illustrated in part (a) of FIG. 6A and the captured image illustrated in part (b) of FIG. 6A.

After acquiring the captured images, the acquiring unit 151 extracts only the hand and fingers area from the acquired captured images. For example, the acquiring unit 151 detects a skin-colored area based on color information of each pixel in the image and conditions related to colors used for extraction, and extracts only the hand and fingers area from the captured image.

For example, when the object is a hand, the acquiring unit 151 detects the area of the hand based on the color information indicating the color of the hand and the color of each pixel in the acquired images. As color information, for example, expression (1) and expression (2), below, are used. Expression (1) expresses conditions related to a value of hue (H) when pixel values of the image are expressed by the HSV color system. Expression (2) expresses conditions related to the value of saturation (S) when the pixel values of the image are expressed by the HSV color system.

$$0.11 < H < 0.22 \quad (1)$$

$$0.2 < S < 0.5 \quad (2)$$

The acquiring unit 151 then calculates an area of the detected area of the object. For example, the acquiring unit 151 sets "1 (black)" to pixels to which the conditions related to color are applicable, and "0 (white)" to pixels to which the conditions related to color are not applicable among the pixels in the acquired image, thereby generating a binary image. The acquiring unit 151 then detects the number of pixels in the area as the area. In an instance in which the colors in the image are expressed by a color system other than the HSV color system, the acquiring unit 151 converts the colors in the image to the HSV color system.

Figure 6B:
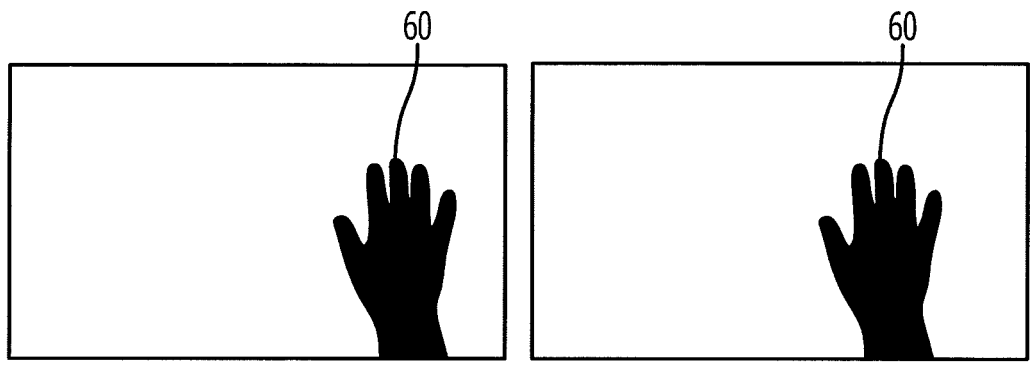
FIG. 6B is a diagram explaining the process for extracting an area of an object.

FIGS. 6A and 6B are diagrams explaining a process for extracting the area of the manipulating object. FIG. 6A illustrates the acquired images. FIG. 6A illustrates one of the images respectively acquired by the two cameras 1 and 2. However, the acquiring unit 151 performs similar processing on both images, thereby extracting the area of the manipulating object in each image. For example, in the image illustrated in FIG. 6A, a hand 6, an object 7, an object 8, and a background are captured. Here, in the actual image, the hand 6, the object 7, and the object 8 are in different colors.

FIG. 6B illustrates binary images corresponding to the images in FIG. 6A. In the binary images, only a hand area 60 corresponding with the hand 6 is illustrated. In other words, by performing the process for detecting the hand area 60 on the image in FIG. 6A, an area composed of pixels meeting the conditions related to color in the images in FIG. 6A is expressed in the binary images as the hand area 60.

The acquiring unit 151 then detects pixels configuring a tip portion of the fingers as, for example, feature points, based on the shape of the area of the manipulating object. Specifically, the acquiring unit 151 uses the shape of the hand area 60 in FIG. 6B and detects feature points. Then, the acquiring unit 151 acquires the coordinates (x,y) of the feature points in each binary image.

Here, in the detection of the feature points, pattern matching of a shape model of the tips of the fingers and the shape of the extracted hand area 60 is used. In addition, a method may be used in which, in addition to the shape of the hand area 60 being recognized, the finger area is extracted and a tilt of the finger area is used. For example, a technology disclosed in Japanese Laid-open Patent Publication No. 2003-346162 may be used.

The measuring unit 152 measures the three-dimensional coordinate position of the manipulating object included in the captured image acquired by the acquiring unit 151. For example, the measuring unit 152 detects the three-dimensional coordinates (x,y,z) of the hand and fingers. The coordinates may be the coordinates of a specific fingertip, such as the tip of the index finger, of the hand and fingers. In addition, a plurality of coordinates may be detected for all fingertips. Alternatively, the coordinates may be the coordinates of a center of an image of the back or palm of a hand determined from the plurality of coordinates of the fingertips. As a method for detecting the three-dimensional coordinates of the hand and fingers, there is a method that uses stereoscopy. In this instance, the measuring unit 152 first detects the coordinates of the hand and fingers on a camera coordinate system of the captured image.

For example, the measuring unit 152 detects index finger coordinates F1b=(X1b,Y1b) of the camera 1 and index finger coordinates F2b=(X2b,Y2b) of the camera 2. Then, the measuring unit 152 determines the three-dimensional coordinates based on the principle of triangulation, using the distance between X2b and X1b. Then, the measuring unit 152 detects a gesture based on the shape of the detected hand and fingers area and changes from a previous shape of the hand and fingers area, and judges whether or not the gesture is a predetermined gesture. As a result, when judged that the gesture is a predetermined gesture, or in other words, when judged that the gesture is a gesture related to manipulation, the measuring unit 152 notifies the display unit 153 of an instruction to display an alert pattern.

In addition, the measuring unit 152 may predict the three-dimensional coordinates (x',y',z') of the hand and fingers in a next frame based on the detected three-dimensional coordinates of the hand and fingers. The measuring unit 152 compares a previous three-dimensional coordinate position of the hand and fingers with the current three-dimensional coordinate position of the hand and fingers, and predicts the three-dimensional coordinate position of the hand and fingers based on the changes in the three-dimensional coordinates. For example, when display is performed based on the detected information of the hand and fingers, a time delay occurs from the time at which the image is captured to the time at which the image is displayed. Because the hand and fingers may move during this time period, as a result of the three-dimensional coordinates of the hand and fingers being predicted and display being performed to match the destination of the movement, the alert pattern, described hereafter, may be displayed without being misaligned from an intended position. As a method for making the prediction, an approximation expression to convert time into coordinates is determined from the acquired three-dimensional coordinates (x,y,z) and the three-dimensional coordinates (x,y,z) of the hand and fingers in a previous frame, and the times at which the three-dimensional coordinates have acquired. The position at which the alert pattern is to be displayed at the time of the next frame is then predicted.

Next, the measuring unit 152 determines where the three-dimensional coordinates of the hand and fingers are present in the three-dimensional measurement-enabled area. Here, the method for setting the three-dimensional measurement-enabled area will be described. In the three-dimensional coordinate system illustrated in FIG. 8, the setting coordinates of the camera 1 is (−D/2,0,0) and the setting coordinates of the camera 2 is (D/2,0,0). Furthermore, from the horizontal angle-of-view $\alpha_{ch}$ and the vertical angle-of-view $\alpha_{cv}$, of the camera, a lateral field-of-view range Rh(z) at a distance z from the lens in the Z-axis direction is set to Rh(z)=2×z×tan($\alpha_{ch}$/2), and a vertical field-of-view area Rv(z) is set to Rv(z)==2×z×tan($\alpha_{cv}$/2). Here, tan(θ) represents a value of a tangent at angle θ. The three-dimensional measurement-enabled area is expressed as a location where the field-of-view ranges of the two cameras 1 and 2 overlap. Therefore, the three-dimensional measurement-enabled area in the X and Y directions at the distance z from the lens in the Z-axis direction is as indicated below. The three-dimensional measurement-enabled area in the X direction is expressed as coordinates in a range of "X-coordinate minimum value minX(z)=−(Rh(z)−D)/2" and "X-coordinate maximum value maxX(z)=(Rh(z)−D)/2". In addition, the three-dimensional measurement-enabled area in the Y direction is expressed as coordinates in a range of "Y-coordinate minimum value minY(z)=−Rv(z)/2" and "Y-coordinate maximum value maxY(z)=Rv(z)/2". In addition, a Z-coordinate maximum value of the three-dimensional measurement-enabled area is the table surface and is therefore "Z-coordinate maximum value maxZ=Lc".

Figure 7:
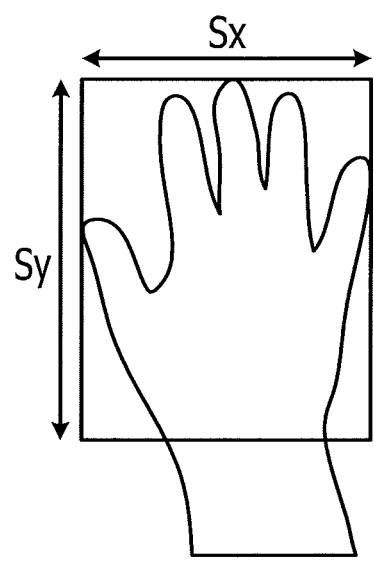
FIG. 7 is a diagram illustrating a detected size of a hand.

Here, when the hand and fingers are too near the cameras 1 and 2, the overall hand and fingers are not captured by the cameras 1 and 2, and it is difficult to recognize a gesture. Therefore, the minimum value minZ of the Z coordinate of the three-dimensional measurement-enabled area is the minimum distance at which the hand may be captured. When the size of the hand is expressed by X direction Sx and Y direction Sy as illustrated in FIG. 7, because the Z coordinate at which the field-of-view range in the short-side Y direction of the captured image becomes the same as Sy is minZ, Rv(minZ)=Sy. When this is solved, the "Z-coordinate minimum value minZ=Sy/(2×tan($\alpha_{cv}$/2))". FIG. 7 is a diagram illustrating a detected size of the hand.

Figure 8:
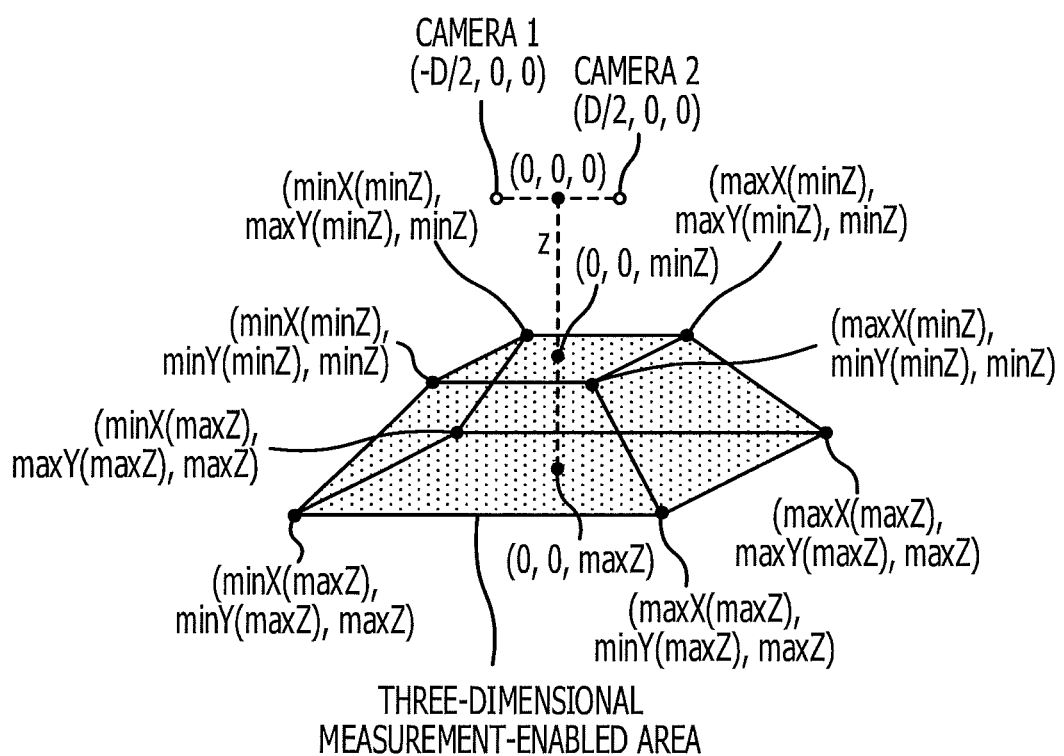
FIG. 8 is a diagram illustrating three-dimensional coordinates of a three-dimensional measurement-enabled area.

A solid and the corresponding coordinates thereof indicating the three-dimensional measurement-enabled area having the minimum values and the maximum values of X, Y, and Z as described above are as illustrated in FIG. 8. When the three-dimensional coordinates (x,y,z) of the hand and fingers are provided as described above, the three-dimensional measurement-enabled area minX(z), maxX(z), minY(z), maxY(z), minZ, and maxZ are determined. FIG. 8 is a diagram illustrating the three-dimensional coordinates of the three-dimensional measurement-enabled area.

The display unit 153 controls the projector 3 so that an image may be displayed on the manipulating object based on the distance between the three-dimensional coordinate position measured by the measuring unit 152, and the border of the three-dimensional area in which three-dimensional coordinate position of the manipulating object may be measured, determined by the cameras 1 and 2. After a gesture is detected by the measuring unit 152, the display unit 153 performs a process to generate and display the alert pattern, as described hereafter. Whether or not the alert pattern is displayed may be changed depending on the state of the gesture or the state of an application. For example, the alert pattern may be displayed only when all five fingers are open. Alternatively, the alert pattern may be displayed only when the application is displaying color on an object, such as a product mock-up. Here, when judged that the alert pattern is not displayed, subsequent processing operations are not performed.

Figure 9A:
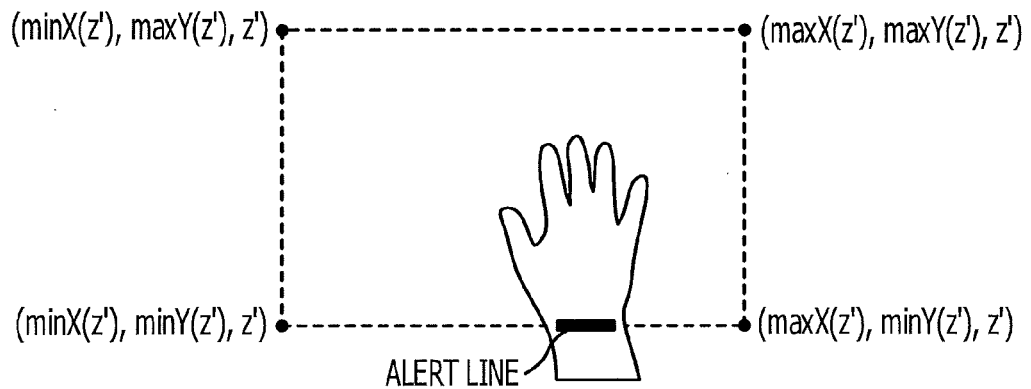
FIG. 9A is a diagram illustrating display of an alert line in an instance in which a hand and fingers move in an X direction.
Figure 9B:
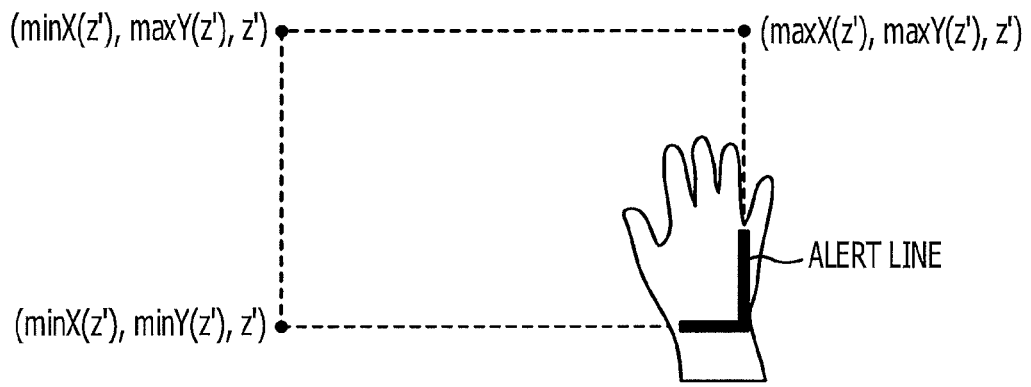
FIG. 9B is a diagram illustrating display of the alert line in an instance in which the hand and fingers move in the X direction.
Figure 9C:
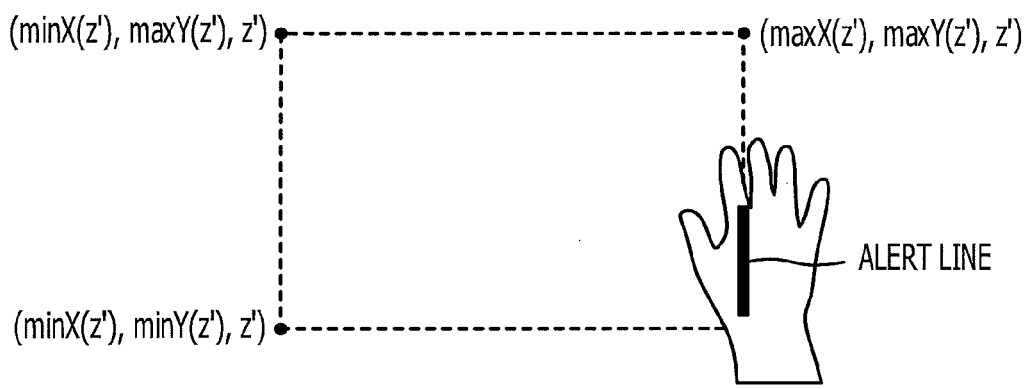
FIG. 9C is a diagram illustrating display of the alert line in an instance in which the hand and fingers move in the X direction.
Figure 10A:
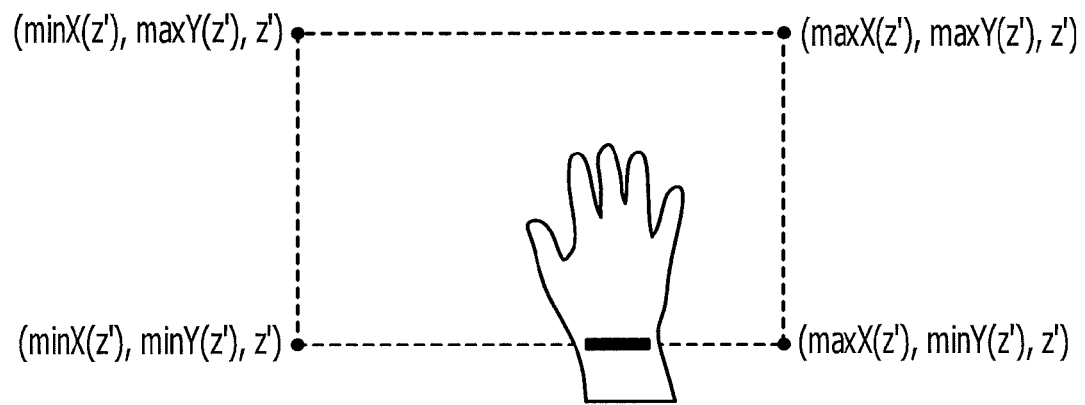
FIG. 10A is a diagram illustrating display of the alert line in an instance in which the hand and fingers move in a Y direction.
Figure 10B:
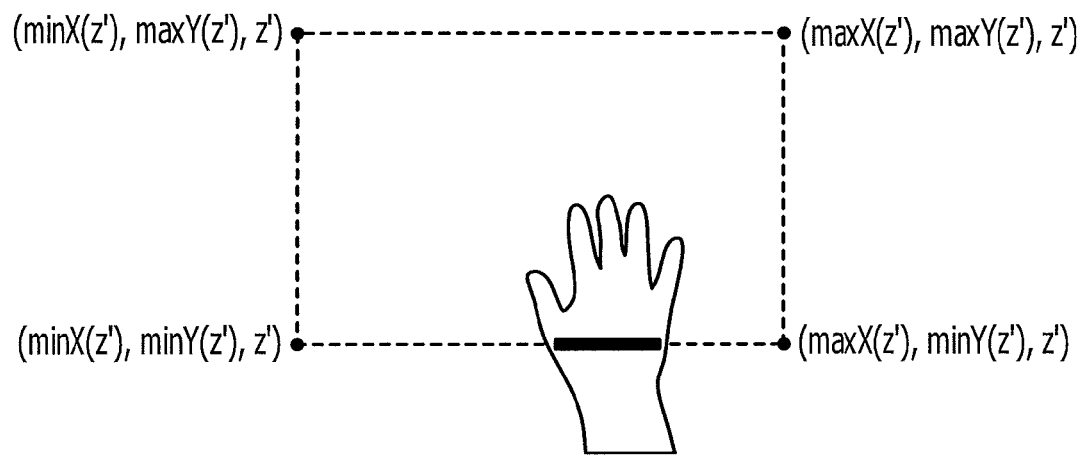
FIG. 10B is a diagram illustrating display of the alert line in an instance in which the hand and fingers move in the Y direction.
Figure 10C:
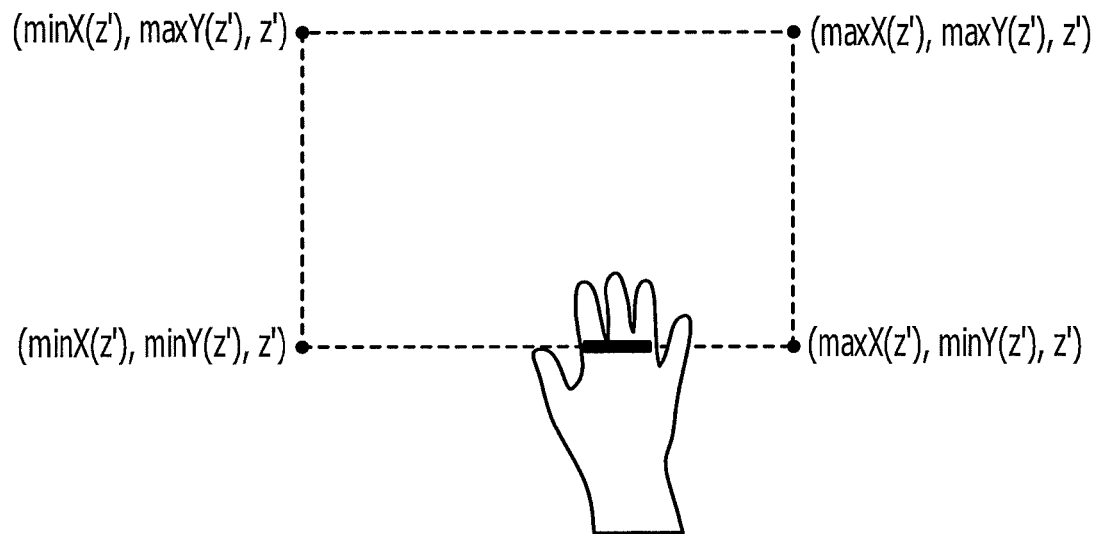
FIG. 10C is a diagram illustrating display of the alert line in an instance in which the hand and fingers move in the Y direction.
Figure 11A:
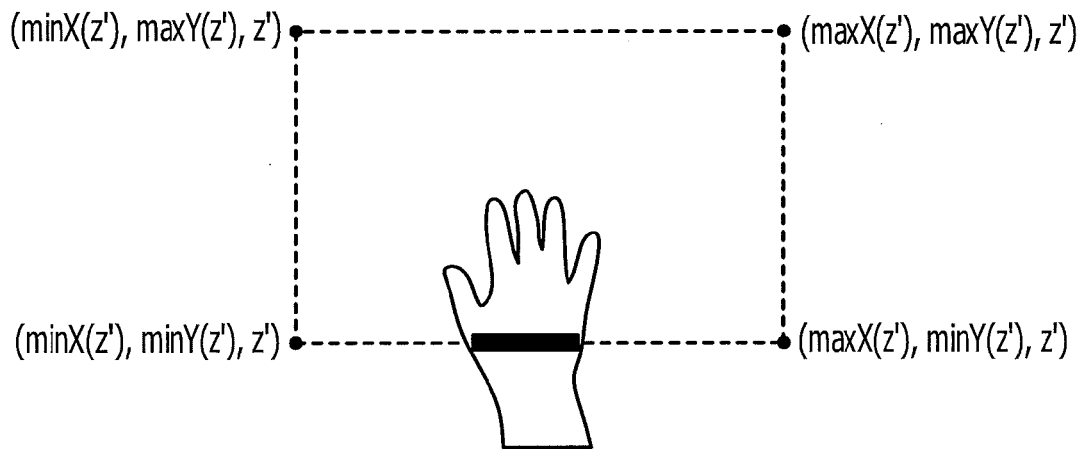
FIG. 11A is a diagram illustrating display of the alert line in an instance in which the hand and fingers move in the Y direction.
Figure 11B:
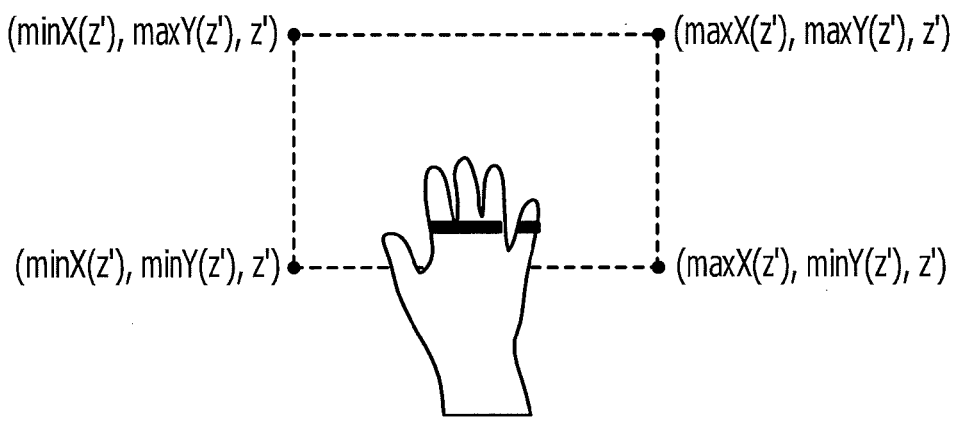
FIG. 11B is a diagram illustrating display of the alert line in an instance in which the hand and fingers move in the Y direction.
Figure 11C:
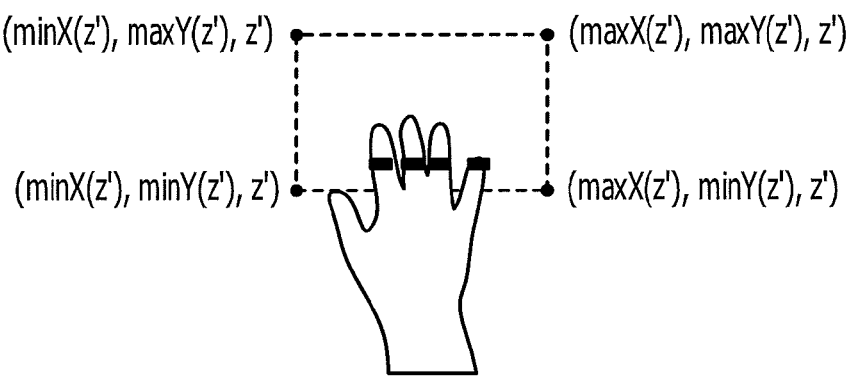
FIG. 11C is a diagram illustrating display of the alert line in an instance in which the hand and fingers move in the Y direction.

For example, first, the display unit 153 uses the three-dimensional measurement-enabled area minX(z), maxX(z), minY(z), maxY(z), minZ, and maxZ and generates the alert pattern. An alert pattern of an instance in which the hand and fingers are moved over a three-dimensional area and an example of the display position of the alert pattern will be described with reference to FIGS. 9A to 11C. FIGS. 9A to 9C are diagrams illustrating display of an alert line in an instance in which the hand and fingers are moved in the X direction. FIGS. 10A to 10C are diagrams illustrating display of the alert line in an instance in which the hand and fingers are moved in the Y direction. FIGS. 11A to 11C are diagrams illustrating display of the alert line in an instance in which the hand and fingers are moved in the Y direction.

Figure 12:
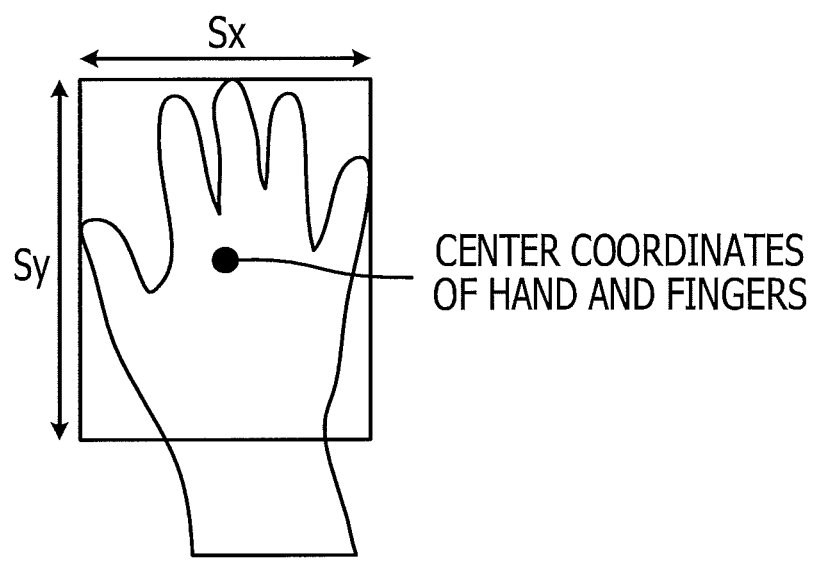
FIG. 12 is a diagram illustrating center coordinates of the hand and fingers.

FIGS. 9A to 9C are diagrams of an instance in which the manipulator is moving in a rightward direction (positive direction on the X axis) in the order of FIG. 9A, FIG. 9B, and FIG. 9C. The broken lines indicate the XY-coordinate three-dimensional measurement-enabled area on the Z coordinate of the hand and fingers. The broken line is not actually displayed by the projector 3. In addition, in FIGS. 9A to 9C, the alert line is displayed on a portion of the hand and fingers as the alert pattern. The alert line is a line segment in a certain color (such as red or green) and is displayed by the projector 3 by being irradiated onto the hand and fingers. In FIG. 9A, the alert line is displayed in a position on the hand and fingers indicating minY(z). In FIG. 9B, a line segment indicating maxX(z) is displayed in addition to the line segment indicating minY(z). In FIG. 9C, the line segment indicating maxX(z) is displayed. When the line segment is displayed, a distance distX1 from the three-dimensional coordinates (x,y,z) of the hand and fingers to the minimum value minX(z) in the X direction of the three dimensional measurement-enabled area and a distance distX2 to the maximum value maxX(z) are determined. Here, distX1 may be determined by an expression "distX1=x−minX(z)". In addition, distX2 may be determined by an expression "distX2=maxX(z)−x". As illustrated in FIG. 12, for example, the three-dimensional coordinates of the hand and fingers are coordinates obtained by three-dimensional measurement being performed on the center coordinates of the area of the hand and fingers in the captured image. FIG. 12 is a diagram illustrating the center coordinates of the hand and fingers.

Then, display of a vertical alert line is decided when distX1<Sx/2+M1 or distX2<Sx/2+M2. M1 and M2 represent margins, and are positive fixed values that are zero or greater.

When distX1<Sx/2+M1, the alert line may be determined to be a line segment connecting two points: point 1 (x−Sx/2+distX1×C1,y−Sy/2,z) and point 2 (x−Sx/2+distX1×C1,y+Sy/2,z). In addition, when distX2<Sx/2+M2, the display position may be determined such that the alert line is a line segment connecting two points: point 1 (x+Sx/2−distX2×C2,y−Sy/2,z) and point 2 (x+Sx/2−distX2×C2,y+Sy/2,z).

C1 and C2 represent coefficients. For example, C1 and C2 may be prescribed as C1=(Sx/2)/(Sx/2+M1) and C2=(Sx/2)/(Sx/2+M2). The alert line determined as described above appears from the right side of the hand and fingers and moves towards the left side as the hand and fingers approach the right end (positive X direction) of the three-dimensional measurement-enabled area. When the alert line reaches the leftmost portion of the hand and fingers, the hand and fingers have left the three-dimensional measurement-enabled area. Conversely, the alert line appears from the left side of the hand and fingers and moves towards the right side as the hand and fingers approach the left end (negative X direction) of the three-dimensional measurement-enabled area. When the alert line reaches the rightmost portion of the hand and fingers, the hand and fingers have left the three-dimensional measurement-enabled area. The length of the alert line in the Y direction may be set to a short length, so as not to extend beyond the hand.

FIGS. 10A to 10C are diagrams of an instance in which the manipulator is moving in a forward direction (negative direction on the Y axis) in the order of FIG. 10A, FIG. 10B, and FIG. 10C. As illustrated in FIGS. 10A to 10C, although the alert line is displayed in a position indicating minY(z) on the hand and fingers, the alert line also moves from the wrist side to the fingertip side in adherence to the movement of the hand and fingers. When the line segment is displayed, a distance distY1 from the three-dimensional coordinates (x,y,z) of the hand and fingers to the minimum value in the Y direction of the three-dimensional measurement-enabled area and a distance distY2 to the maximum value are determined. The distance distY1 may be determined by an expression "distY1=y−minY(z)" and the distance distY2 may be determined by an expression "distY2=maxY(z)−y".

Here, when distY1<Sy/2+M1 or distY2<Sy/2+M2, the display unit 153 determines that a vertical alert line is displayed. In addition, when distY1<Sy/2+M1, the alert line is a line segment connecting two points: point 1 (x−Sx/2, y−Sy/2+distY1×C1,z) and point 2 (x+Sx/2,y−Sy/2+distY1× C1,z). In addition, when distY2<Sy/2+M2, the display position may be determined such that the alert line is a line segment connecting two points: point 1 (x−Sx/2,y+Sy/2−distY2×C2,z) and point 2 (x+Sx/2,y+Sy/2−distY2×C2,z). C1 and C2 are coefficients and, for example, may be prescribed as C1=(Sy/2)/(Sy/2+M1) and C2=(Sy/2)/(Sy/2+M2).

FIGS. 11A to 11C are diagrams of an instance in which the manipulator is moving in an upward direction (negative direction on the Z axis) in the order of FIG. 11A, FIG. 11B, and FIG. 11C. As illustrated in FIGS. 11A to 11C, although the alert line is displayed in a position indicating minY(z) on the hand and fingers, the alert line also moves from the wrist side to the fingertip side in adherence to the movement of the hand and fingers.

Regarding the Z axis, judgment is made based on a distance distZ=−minZ from the three-dimensional coordinates of the hand and fingers to minZ. Because maxZ is a distance from the camera to the table surface, and the hand and fingers are not present below the table surface, the maximum value does not have to be considered.

When M3 is set to a fixed value that is greater than zero, the alert line is displayed when distZ<M3. Because the alert line display onto the hand and fingers by the projector 3 is two dimensional and the alert line is a vertical or lateral line, the Z axis is assigned to either the vertical or lateral line and moved. For example, min(a,b) is an expression that returns the smaller value of a and b. Then, when min(distX1,distX2) <min(distY1,distY2), the alert line is displayed as a line segment connecting two points with a vertical line, the two points being: point 1 (x−Sx/2+distZ×C3,y−Sy/2,z) and point 2 (x−Sx/2+distZ×C3,y+Sy/2,z).

Here, when min(distX1,distX2)min(distY1,distY2), the display unit 153 displays the alert line as a line segment connecting two points with a lateral line, the two points being: point 1 (x−Sx/2,y−Sy/2+distZ×C3,z) and point 2 (x+Sx/2,y−Sy/2+distZ×C3,z).

The display unit 153 displays both vertical and lateral alert lines when conditions for displaying alert lines in both X and Y directions are met. In addition, the display unit 153 displays either of the vertical or lateral line assigned to the Z axis, and the vertical or lateral line of the X or Y axis, or both, when conditions for displaying the alert line in the Z direction are also met.

Figure 13A:
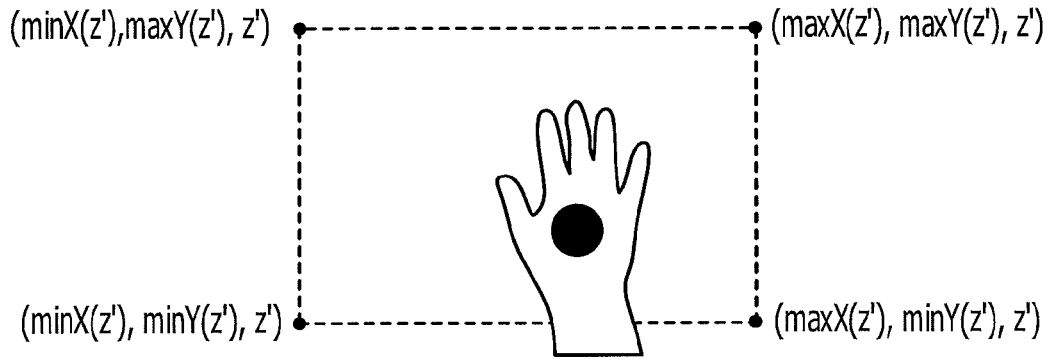
FIG. 13A is a diagram illustrating display of an alert circle in an instance in which the hand and fingers move in the X direction.
Figure 13B:
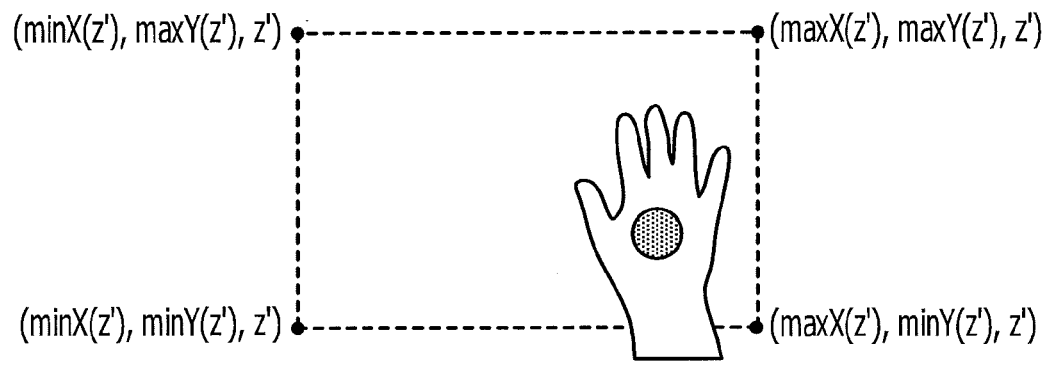
FIG. 13B is a diagram illustrating display of the alert circle in an instance in which the hand and fingers move in the X direction.
Figure 13C:
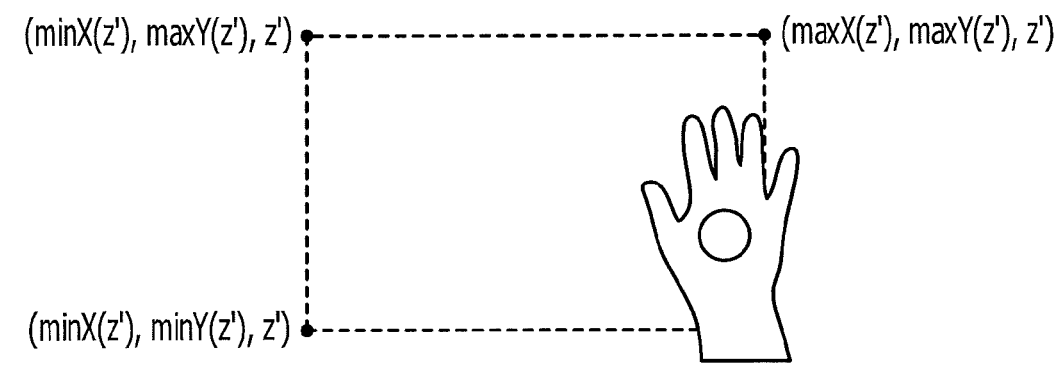
FIG. 13C is a diagram illustrating display of the alert circle in an instance in which the hand and fingers move in the X direction.

In addition, the display unit 153 may use a graphic form, such as a circle or a rectangle, instead of a line as the alert pattern. In this instance, distX1, distX2, distY1, distY2, and distZ may be proportioned or inversely proportioned. The concentration and the color of the display color, and the display size on the hand and fingers may be changed. Examples in FIGS. 13A to 13C illustrate display examples of an alert circle when the hand and fingers move in the positive X direction. The display unit 153 generates an alert pattern in which the concentration of the display color decreases as the hand and fingers approach the edge of the three-dimensional measurement-enabled area. In addition, the display unit 153 may generate and display an alert pattern in another display color as the hand and fingers approach the edge of the three-dimensional measurement-enabled area. For example, when the hand and fingers are apart from the border of the three-dimensional measurement-enabled area by predetermined distance or more, the display unit 153 may generate and display a blue alert pattern. When the hand and fingers are apart from the border of the three-dimensional measurement-enabled area by less than the predetermined distance, the display unit 153 may generate and display a red alert pattern. In addition, the display unit 153 may generate and display an alert pattern that increases in size as the hand and fingers approach the edge of the three-dimensional measurement-enabled area.

Next, the display unit 153 controls the projector 3 so as to display the generated alert pattern. When the alert line is displayed, the display color is a color that is visible when displayed on the hand of the user, such as green. In addition, the line has a certain thickness that is visible. The display position of the alert line is determined by the three-dimensional coordinates. However, the projector 3 converts the display position to displayable two-dimensional coordinates. The conversion from the three-dimensional coordinates (a,b,c) to projector coordinates (xp,yp) will be described hereafter.

With the setting height of the projector 3 from the table surface as Lp, the horizontal angle-of-view of the projector 3 as $\alpha_{ph}$, and the vertical angle-of-view of the projector 3 as $\alpha_{pv}$, the display pixel number width of the projector 3 is Spw, and the display pixel number height is Sph. A lateral projection range Rph(c) at distance c in the Z axis direction of the projector 3 is set to Rph(c)=2×c×tan($\alpha_{ph}$/2). A vertical projection range Rpv(c) is set to Rpv(c)=2×c×tan($\alpha_{pv}$/2). The X-coordinate minimum value on the three-dimensional coordinate system in the projection range is "minPx(c)= −Rph(c)/2". The X-coordinate maximum value is "maxPx(c)=Rph(c)/2". The Y-coordinate minimum value is "minPy(c)=−Rpv(c)/2". The Y-coordinate maximum value is "maxPy(c)=Rpv(c)/2".

Because the X and Y projection ranges become the projector coordinate system, at the height c on the three-dimensional coordinate system, (0,0) on the projector coordinate system is equivalent to the three-dimensional coordinates (minPx(c),minPy(c),c). The projector coordinates (Spw,Sph) are equivalent to the three-dimensional coordinates (maxPx(c),maxPy(c),c). Based on these coordinates, xp and yp may be expressed using a, b, and c by the following expression (3) and expression (4).

$$xp=(a-minPx(c))/((maxPx(c)-minPx(c))/Spw) \quad (3)$$

$$xy=(b-minPy(c))/((maxPy(c)-minPy(c))/Sph) \quad (4)$$

The three-dimensional coordinates (a,b,c) determined as described above are converted to the projector coordinates (xp,yp), and a display pattern is outputted on the projector coordinates (xp,yp), thereby displaying the alert pattern on the hand and fingers. When xp<0, yp<0, xp≥Spw, or yp≥Sph, the alert pattern is not displayed. The alert pattern is displayed on the hand and fingers of the user as described above. Finally, the display unit 153 performs display of an application based on the gesture, such as changing a color irradiated onto the object. The above-described process is performed every time each camera 1 and 2 captures an image.

[Process Performed by Information Processing Device]

Next, processes performed by the information processing device 10 according to the embodiment 1 will be described with reference to FIG. 14. FIG. 14 is a flowchart of procedures in an alert line display process performed by the information processing device.

As illustrated in FIG. 14, the acquiring unit 151 of the information processing device 10 acquires the captured images captured by the cameras 1 and 2 (step S101). For example, the acquiring unit 151 acquires the images from the two cameras 1 and 2, 60 times per second. Next, the acquiring unit 151 detects only the hand and fingers area from each of the captured images.

Then, the acquiring unit 151 extracts only the hand and fingers area from each of the captured images (step S102). For example, the acquiring unit 151 detects a skin-colored area based on color information of each pixel in the image and conditions related to color for extraction, and extracts only the hand and fingers area from the captured image.

Next, the measuring unit 152 detects the three-dimensional coordinate position (x,y,z) of the hand and fingers included in each captured image acquired by the acquiring unit 151 (step S103). Then, the measuring unit 152 recognizes the gesture based on the shape of the detected hand and fingers area and changes from the shape of the previous hand and fingers area (step S104).

Then, the measuring unit 152 judges whether or not a predetermined gesture is made (step S105). For example, the measuring unit 152 judges whether or not the gesture is related to a manipulation, such as a selection manipulation or a deciding manipulation. As a result, when judged by the measuring unit 152 that the gesture is not a predetermined gesture, or in other words, that the gesture is not related to a manipulation (No at Step S105), the display unit 153 performs display of an application (step S109).

In addition, when judged by the measuring unit 152 that the gesture is a predetermined gesture, or in other words, that the gesture is related to a manipulation (Yes at step S105), the display unit 153 decides the display position of the alert pattern (step S106). The display unit 153 then judges whether or not to display the alert pattern (step S107). For example, the display unit 153 judges whether or not to display the alert pattern depending on whether or not the three-dimensional coordinates of the hand and fingers has approached the border of the three-dimensional measurement-enabled area.

As a result, when judged by the display unit 153 that the alert pattern is not to be displayed (No at step S107), the display unit 153 performs display of an application (step S109). In addition, when judged by the display unit 153 that the alert pattern is to be displayed (Yes at step S107), the display unit 153 displays the alert line (step S108) and performs display of an application (step S109).

As described above, the information manipulation display system 100 includes the cameras 1 and 2, the projector 3, and the information processing device 10. The information processing device 10 acquires the captured images captured by the cameras 1 and 2, and measures the three-dimensional coordinate position of the manipulating object included in the acquired captured images. The information processing device 10 then controls the projector 3 such as to display an image on the hand and fingers based on the distance between the measured three-dimensional coordinate position and the border of the three-dimensional area in which the three-dimensional coordinate position of the hand and fingers may be measured, which is determined by the cameras 1 and 2. Therefore, the information processing device 10 is capable of improving manipulation.

An alert pattern is displayed on the hand and fingers before the hand and fingers leave the three-dimensional measurement-enabled area. From this display state, the user may recognize whether or not the hand and fingers will leave the detection area if the user continues the same movement. As a result, the user may move the hand and fingers without leaving the three-dimensional measurement-enabled area. In addition, as a result of the alert display being performed on the hand and fingers, the user may intuitively know that the hand and fingers are about to leave the detection area by simply watching the hand and fingers. An effect is also achieved in that display on a paper surface or object is not affected.

In addition, according to the embodiment 1, the information processing device 10 compares the previous three-dimensional coordinate position of the manipulated object with the current three-dimensional coordinate position of the manipulated object. Based on the changes in the three-dimensional coordinate position, the information processing device 10 predicts the three-dimensional coordinate position of the manipulating object. The information processing device 10 then controls the projector 3 such as to display an image on the manipulating object based on the distance between the predicted three-dimensional coordinate position of the manipulating object and the border of the three-dimensional area. Therefore, when the information processing device 10 predicts the three-dimensional coordinates of the hand and fingers and performs display matching the destination of the movement, the information processing device 10 is capable of displaying the alert pattern, described hereafter, without misalignment with the intended position.

In addition, according to the embodiment 1, the information processing device 10 controls the projector 3 to display a vertical line or a lateral line on the manipulating object. The vertical line or the lateral line suggests the border of the three-dimensional area. The manner of display of the vertical line or the lateral line changes depending on the three-dimensional coordinate position of the hand and fingers. Therefore, the information processing device 10 is capable of enabling the user to understand the three-dimensional area. The user is capable of moving the hand and fingers without leaving the three-dimensional measurement-enabled area.

In addition, according to the embodiment 1, the information processing device 10 controls the projector 3 such that a graphic form is displayed on the hand and fingers. The color of the graphic form changes depending on the distance between the three-dimensional coordinate position of the hand and fingers and the border of the three-dimensional area. Therefore, the information processing device 10 is capable of notifying the user in an easy-to-understand manner whether or not the hand and fingers are about to leave the three-dimensional measurement-enabled area by the change in color.

In addition, according to the embodiment 1, the information processing device 10 controls the projector 3 such as to display a graphic form on the hand and fingers. The concentration of the graphic form changes depending on the distance between the three-dimensional coordinate position of the hand and fingers and the border of the three-dimensional area. Therefore, the information processing device 10 is capable of easily notifying the user whether nor not the hand and fingers are about to leave the three-dimensional measurement-enabled area by the change in concentration.

In addition, according to the embodiment 1, the information processing device 10 controls the projector 3 such as to display a graphic form on the hand and fingers. The display size of the graphic form changes depending on the distance between the three-dimensional coordinate position of the hand and fingers and the border of the three-dimensional area. Therefore, the information processing device 10 is capable of easily notifying the user whether nor not the hand and fingers are about to leave the three-dimensional measurement-enabled area by the change in display size of the graphic form.

In addition, according to the embodiment 1, in an instance in which a specific gesture by the hand and fingers is detected, the information processing device 10 controls the projector 3 such as to display an image on the hand and fingers based on the distance between the measured three-dimensional coordinate position of the hand and fingers and the border of the three-dimensional area. Therefore, when the specific gesture is not detected, the information processing device 10 does not perform display control of the image. As a result, processing load is able to be reduced.

In addition, according to the embodiment 1, when an application that is being run is in a specific state, the information processing device 10 controls the projector 3 such as to display an image on the hand and fingers depending on the distance between the measured three-dimensional coordinate position of the hand and fingers and the border of the three-dimensional area. Therefore, when the application that is being run is not in the specific state, the information processing device 10 does not perform display control of the image. As a result, processing load is able to be reduced.

Embodiment 2

An embodiment related to the system of the present disclosure is described above. However, the disclosed technology may be implemented in various other ways, in addition to the above-described embodiment. Another embodiment included in the present technology will be described hereafter.

(1) Monocular Camera

Figure 15:
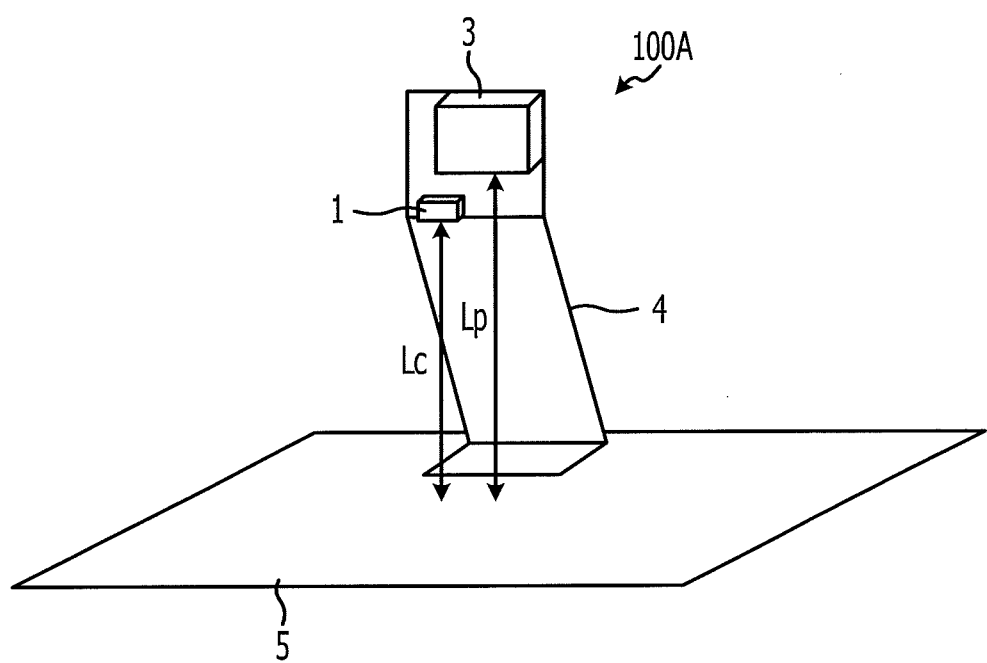
FIG. 15 is a diagram illustrating a hardware configuration of the information manipulation display system in an instance in which a monocular camera is used.

According to the embodiment 1 described above, an example of a stereo camera that captures images of the hand and fingers using two cameras is described. However, the technology is not limited thereto. A monocular camera that captures an image of the hand and fingers using a single camera may also be used. Here, a hardware configuration of an information manipulation display system 100A in an instance in which a monocular camera is used will be described with reference to FIG. 15. FIG. 15 is a diagram illustrating a hardware configuration of an information manipulation display system in an instance of a monocular camera.

As illustrated in FIG. 15, in the information manipulation display system 100A, a single camera 1 and the projector 3 are fixed to the fixing base 4 as a device set on the table 5. The single camera 1 serves as the monocular camera. In a manner similar to that according to the embodiment 1, the single camera 1 and the projector 3 are connected by wire or wirelessly to a computer.

As illustrated in FIG. 15, the camera 1 is set in parallel with the table surface at a height of Lc from the table surface. The projector 3 is set at a height of Lp from the table surface at the center of the camera 1.

Figure 16:
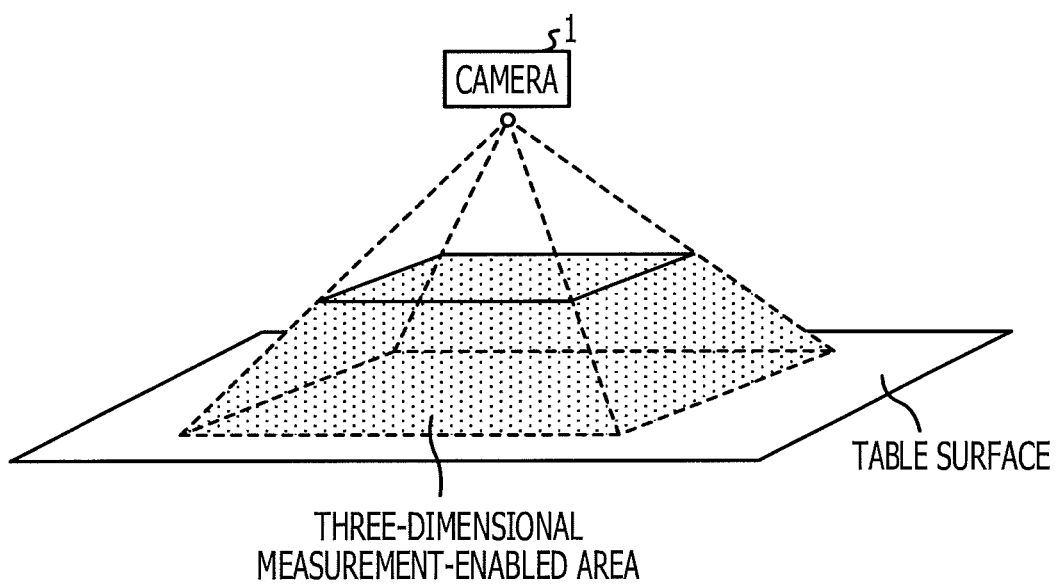
FIG. 16 is a diagram illustrating a three-dimensional measurement-enabled area in the instance in which a monocular camera is used.

Next, a three-dimensional measurement-enabled area in the instance in which the monocular camera is used will be described with reference to FIG. 16. FIG. 16 illustrates the three-dimensional measurement-enabled area in an instance in which the monocular camera is used. As illustrated in FIG. 16, a three-dimensional field-of-view from the camera 1 to the table surface has a quadrangular pyramid shape. Only a certain area within the quadrangular pyramid serves as the three-dimensional measurement-enabled area.

In addition, the three-dimensional measurement-enabled area serves as the field-of-view range of the single camera 1. Therefore, the three-dimensional measurement-enabled area in the X and Y directions at the distance z from the lens in the Z axis direction is expressed as coordinates in a range of "X-coordinate minimum value minX(z)=−Rh(z)/2", "X-coordinate maximum value maxX(z)=Rh(z)/2", "Y-coordinate minimum value minY(z)=−Rv(z)/2", and "Y-coordinate maximum value maxY(z)=Rv(z)/2". In addition, the Z-coordinate maximum value of the three-dimensional measurement-enabled area is the table surface and is therefore "Z-coordinate maximum value maxZ=Lc". The Z-coordinate minimum value is "Z-coordinate minimum value minZ=Sy/(2×tan($\alpha_{cv}$/2))".

(2) Field-of-View Range

Figure 17:
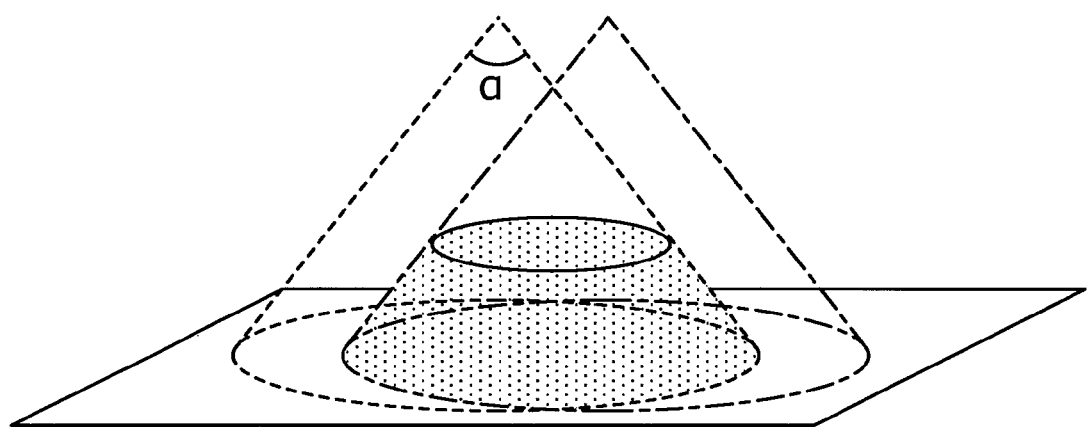
FIG. 17 is a diagram illustrating a three-dimensional measurement-enabled area of a stereo camera capable of acquiring a circular field-of-view range.

According to the above-described embodiment 1, an example described of an instance in which the field-of-view range is rectangular. However, the field-of-view range is not limited thereto and may be circular. Here, the three-dimensional measurement-enabled area of an instance in which the field-of-view range is circular will be described with reference to FIG. 17. FIG. 17 is a diagram illustrating the three-dimensional measurement-enabled area of a stereo camera capable of acquiring a circular field-of-view. As illustrated in FIG. 17, when an angle-of-view of the camera is α, the field-of-view range R(z) at the distance z from the lens in the Z axis direction is "R(z)=2×z×tan(α/2)".

Based on this field-of-view range, the three-dimensional measurement-enabled area is expressed as a location where the field-of-view ranges of the two cameras 1 and 2 overlap. Therefore, the three-dimensional measurement-enabled area in the X and Y directions at the distance z from the lens in the Z-axis direction is "X-coordinate minimum value minX(z)=−(Rh(z)−D)/2", "X-coordinate maximum value maxX(z)=(Rh(z)−D)/2", "Z-coordinate maximum value maxZ=Lc", and "Z-coordinate minimum value minZ=Sy/(2×tan($\alpha_{cv}$/2))".

Figure 18:
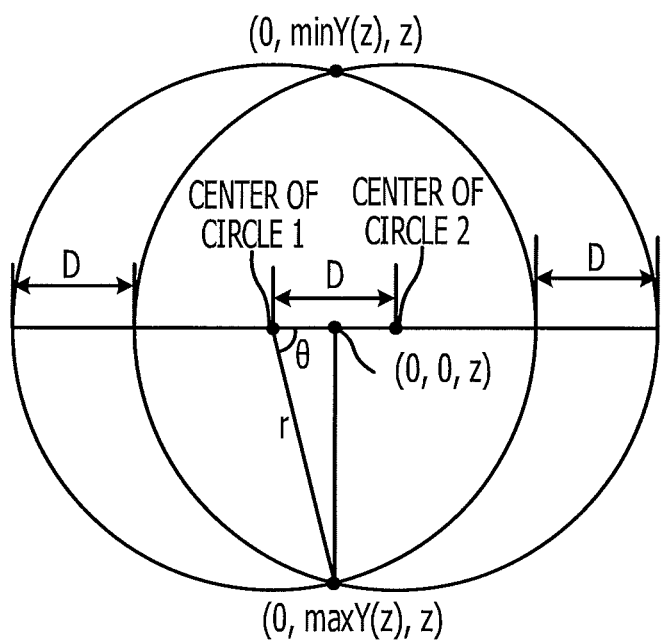
FIG. 18 is a diagram explaining maximum and minimum values of a Y coordinate in the three-dimensional measurement-enabled area of the stereo camera capable of acquiring a circular field-of-view range.

In addition, the maximum and minimum values of the Y coordinate will be described with reference to FIG. 18. FIG. 18 is a diagram explaining the maximum and minimum values of the Y coordinate in a three-dimensional measurement-enabled area of a stereo camera capable of acquiring a circular field-of-view range. As illustrated in FIG. 18, a radius r of the field-of-view range is determined by "r=z×tan(α/2)". In addition, the angle θ illustrated in FIG. 18 is determined by "θ=a cos(D/(2×r))". Here, "a cos" is an abbreviation for inverse cosine (arc cosine). Therefore, the Y-coordinate maximum value is "maxY(z)=tan θ×2/D". The Y coordinate minimum value is "minY(z)=−tan θ×2/D".

(3) System Configuration and the Like

In addition, the constituent elements of each device illustrated in the drawings are functional concepts. The constituent elements are not necessarily needed to be physically configured as illustrated. In other words, specific states of dispersion and integration of the devices are not limited to those illustrated in the drawings. All or some of the devices may be configured to be functionally or physically dispersed or integrated in arbitrary units, depending on various loads and conditions of use. For example, the acquiring unit 151, the measuring unit 152, and the display unit 153 illustrated in FIG. 3 may be integrated or divided accordingly. In addition, all or an arbitrary part of the processing functions performed by the processing units may be actualized by a CPU and a program analyzed and run by the CPU. Alternatively, all or an arbitrary part of the processing functions performed by the processing units may be actualized as hardware using wired logic.

(4) Program

Figure 19:
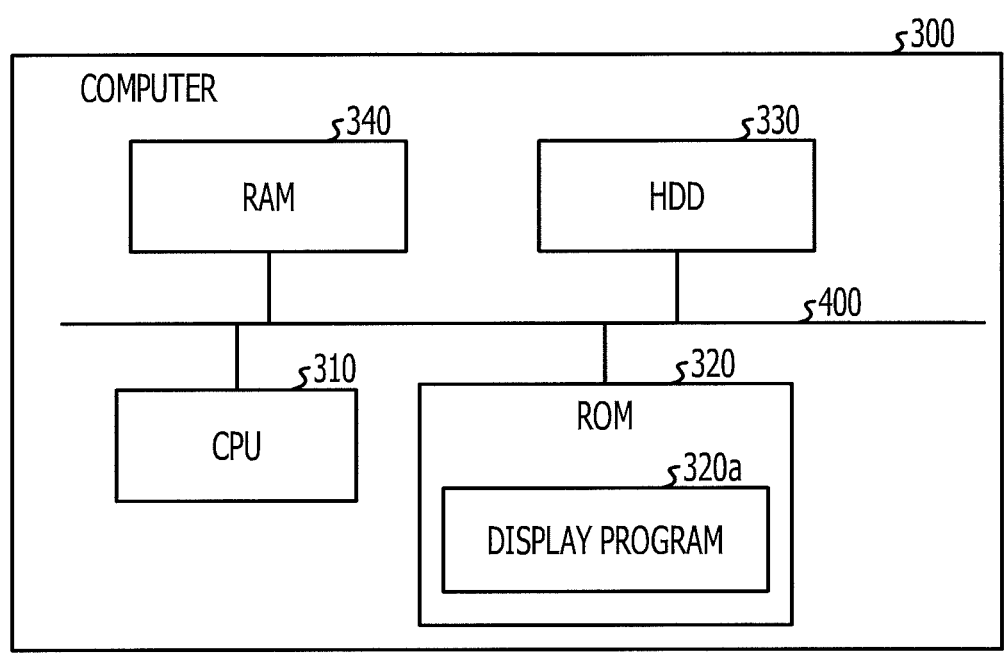
FIG. 19 is a diagram illustrating a computer that runs a display program.

In addition, the various processes described in the above-described embodiments may be actualized by a program that has been prepared in advance being run on a personal computer or a computer system, such as a workstation. An example of a computer system that runs a program including functions similar to those according to the above-described embodiments will be described below. FIG. 19 is a diagram illustrating a computer that runs a display program.

As illustrated in FIG. 19, a computer 300 includes a CPU 310, a read only memory (ROM) 320, a hard disk drive (HDD) 330, and a random access memory (RAM) 340. The CPU 310, the ROM 320, the HDD 330, and the RAM 340 are connected by a bus 400.

A display program 320a that provides functions similar to the processing units according to the above-described embodiments is stored in advance in the ROM 320. For example, the display program 320a that provides functions similar to the control unit 15 according to the above-described embodiments is stored. The display program 320a may be divided accordingly.

The HDD 330 stores therein various pieces of data. For example, the HDD 330 stores therein an OS and various pieces of data.

The CPU 310 reads out the display program 320a from the ROM 320 and runs the display program 320a. As a result, the CPU 310 performs operations similar to those of the processing units according to the embodiments. In other words, the display program 320a performs operations similar to those of the control unit 15 according to the embodiments.

The above-described display program 320a does not have to be stored in the ROM 320 from the start. The display program 320a may be stored in the HDD 330.

For example, the program is stored in a portable physical medium such as a flexible disk (FD), a compact disk read only memory (CD-ROM), a digital versatile disk (DVD), an opto-magnetic disk, an IC card, and the like that is inserted into the computer 300. The computer 300 may then read out the program from the portable physical medium and run the program.

Furthermore, the program is stored in another computer (or server) that is connected to the computer 300 by a public circuit, the Internet, a LAN, a WAN, or the like. The computer may read out the program from the other computer (or server) and run the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
a processor; and
a memory which stores a plurality of instructions, which when executed by the processor, cause the processor to execute:
acquiring an image projected on a projection surface on which a manipulating object is placed by capturing by a camera;
measuring a three-dimensional coordinate position of the manipulating object included in the captured image acquired by the acquiring; and
controlling a projector to display an image on the manipulating object placed on the projection surface based on a distance between the three-dimensional coordinate position measured by the measuring and a border of a three-dimensional area in which the three-dimensional coordinate position of the manipulating object is capable of being measured, determined by the camera, the border not being displayed on the projection surface,
wherein the controlling includes controlling the projector to display a graphic on the manipulating object in a specific color when the manipulating object moves and is over the border of the three-dimensional area, and the graphic is a vertical line segment or a lateral line segment corresponding to a part on the border in which the manipulating object placed on the projection and the border overlap with each other.

2. The device according to claim 1, wherein the measuring includes comparing a previous three-dimensional coordinate position of the manipulating object with a current three-dimensional coordinate position of the manipulating object, and predicting the three-dimensional coordinate position of the manipulating object based on changes in the three-dimensional coordinate position; and
wherein the controlling includes controlling the projector to display an image on the manipulating object based on the distance between the three-dimensional coordinate position of the manipulating object predicted by the measuring and the border of the three-dimensional area.

3. The device according to claim 1, wherein a manner of display changes depending on the three-dimensional coordinate position of the manipulating object.

4. The device according to claim 1, wherein the graphic has a color being changed depending on the distance between the three-dimensional coordinate position of the manipulating object and the border of the three-dimensional area.

5. The device according to claim 1, wherein the graphic has a concentration being changed depending on the distance between the three-dimensional coordinate position of the manipulating object and the border of the three-dimensional area.

6. The device according to claim 1, wherein the graphic has a size being changed depending on the distance between the three-dimensional coordinate position of the manipulating object and the border of the three-dimensional area.

7. The device according to claim 1, wherein the controlling includes controlling the projector to display the image on the manipulating object, based on the distance between the three-dimensional coordinate position of the manipulating object measured by the measuring and the border of the three-dimensional area, when a specific gesture made by the manipulating object is detected.

8. The device according to claim 1, wherein the controlling includes controlling the projector to display the image on the manipulating object, based on the distance between the three-dimensional coordinate position of the manipulating object measured by the measuring and the border of the three-dimensional area, when an application that is running is in a specific state.

9. An information processing method comprising:
acquiring an image projected on a projection surface on which a manipulating object is placed by capturing by a camera;

measuring a three-dimensional coordinate position of the manipulating object included in the captured image acquired by the acquiring; and controlling, by a computer processor, a projector to display an image on the manipulating object placed on the projection surface based on a distance between the three-dimensional coordinate position measured by the measuring and a border of a three-dimensional area in which the three-dimensional coordinate position of the manipulating object is capable of being measured, determined by the camera, the border not being displayed on the projection surface, wherein the controlling includes controlling the projector to display a graphic on the manipulating object in a specific color when the manipulating object moves and is over the border of the three-dimensional area, and the graphic is a vertical line segment or a lateral line segment corresponding to a part on the border in which the manipulating object placed on the projection surface and the border overlap with each other.

10. The method according to claim 9, wherein the measuring includes comparing a previous three-dimensional coordinate position of the manipulating object with a current three-dimensional coordinate position of the manipulating object, and predicting the three-dimensional coordinate position of the manipulating object based on changes in the three-dimensional coordinate position; and wherein the controlling includes controlling the projector to display an image on the manipulating object based on the distance between the three-dimensional coordinate position of the manipulating object predicted by the measuring and the border of the three-dimensional area.

11. The method according to claim 9, wherein a manner of display changes depending on the three-dimensional coordinate position of the manipulating object.

12. The method according to claim 9, wherein the graphic has a color being changed depending on the distance between the three-dimensional coordinate position of the manipulating object and the border of the three-dimensional area.

13. The method according to claim 9, wherein the graphic has a concentration being changed depending on the distance between the three-dimensional coordinate position of the manipulating object and the border of the three-dimensional area.

14. The method according to claim 9, wherein the graphic has a size being changed depending on the distance between the three-dimensional coordinate position of the manipulating object and the border of the three-dimensional area.

15. The method according to claim 9, wherein the controlling includes controlling the projector to display the image on the manipulating object, based on the distance between the three-dimensional coordinate position of the manipulating object measured by the measuring and the border of the three-dimensional area, when a specific gesture made by the manipulating object is detected.

16. The method according to claim 9, wherein the controlling includes controlling the projector to display the image on the manipulating object, based on the distance between the three-dimensional coordinate position of the manipulating object measured by the measuring and the border of the three-dimensional area, when an application that is running is in a specific state.

17. A non-transitory computer-readable storage medium storing an information processing program that causes a computer to execute a process comprising:

acquiring an image projected on a projection surface on which a manipulating object is placed by capturing by a camera;

measuring a three-dimensional coordinate position of the manipulating object included in the captured image acquired by the acquiring; and controlling a projector to display an image on the manipulating object placed on the projection surface based on a distance between the three-dimensional coordinate position measured by the measuring and a border of a three-dimensional area in which the three-dimensional coordinate position of the manipulating object is capable of being measured, determined by the camera, the border not being displayed on the projection surface, wherein the controlling includes controlling the projector to display a graphic on the manipulating object in a specific color when the manipulating object moves and is over the border of the three-dimensional area, and the graphic is a vertical line segment or a lateral line segment corresponding to a part on the border in which the manipulating object placed on the projection surface and the border overlap with each other.

18. The non-transitory computer-readable storage medium according to claim 17, wherein the measuring includes comparing a previous three-dimensional coordinate position of the manipulating object with a current three-dimensional coordinate position of the manipulating object, and predicting the three-dimensional coordinate position of the manipulating object based on changes in the three-dimensional coordinate position; and wherein the controlling includes controlling the projector to display an image on the manipulating object based on the distance between the three-dimensional coordinate position of the manipulating object predicted by the measuring and the border of the three-dimensional area.

19. The non-transitory computer-readable storage medium according to claim 17, wherein a manner of display changes depending on the three-dimensional coordinate position of the manipulating object.

20. The non-transitory computer-readable storage medium according to claim 17, wherein the graphic has one of:

a color, which is changed depending on the distance between the three-dimensional coordinate position of the manipulating object and the border of the three-dimensional area, a concentration, which is changed depending on the distance between the three-dimensional coordinate position of the manipulating object and the border of the three-dimensional area, and a size, which is changed depending on the distance between the three-dimensional coordinate position of the manipulating object and the border of the three-dimensional area.

* * * * *